United States Patent
Toyoshima

(10) Patent No.: US 9,633,457 B2
(45) Date of Patent: Apr. 25, 2017

(54) APPARATUS AND METHOD FOR AUTOMATICALLY DETERMINING GRAPH TYPES, BASED ON ANALYSIS OF ELECTRONIC DOCUMENT

(71) Applicant: FUJITSU LIMITED, Kawasaki-shi, Kanagawa (JP)

(72) Inventor: Takumi Toyoshima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 320 days.

(21) Appl. No.: 14/106,417

(22) Filed: Dec. 13, 2013

(65) Prior Publication Data

US 2014/0184607 A1  Jul. 3, 2014

(30) Foreign Application Priority Data

Dec. 28, 2012 (JP) ................................ 2012-286542

(51) Int. Cl.
*G06T 11/20* (2006.01)
*G06F 17/27* (2006.01)

(52) U.S. Cl.
CPC ........ *G06T 11/206* (2013.01); *G06F 17/2765* (2013.01)

(58) Field of Classification Search
None
See application file for complete search history.

(56) References Cited

U.S. PATENT DOCUMENTS

| 5,050,221 A | 9/1991 | Ohta et al. |
| 6,442,606 B1 * | 8/2002 | Subbaroyan .......... G06F 17/218 707/E17.108 |
| 6,668,354 B1 * | 12/2003 | Chen .................... G06F 17/272 715/255 |

(Continued)

FOREIGN PATENT DOCUMENTS

| CN | 101079031 A | 11/2007 |
| CN | 102027445 A | 4/2011 |
| JP | 3-188579 | 8/1991 |
| JP | 07-302347 A | 11/1995 |
| JP | 2000-268112 | 9/2000 |
| JP | 2009277100 A | * 11/2009 |

OTHER PUBLICATIONS

LabWrite Resources, Graphing Resources—Bar Graphs, 2005, NC State University, retrieved from <<www.ncsu.edu/labwrite/res/gh/gh-bargraph.html#histogram>>, accessed Jan. 4, 2016.*

(Continued)

*Primary Examiner* — Michael J Cobb
(74) *Attorney, Agent, or Firm* — Fujitsu Patent Center

(57) ABSTRACT

An information processing apparatus includes a processor to generate an electronic document including a graph. The processor extracts specialized vocabulary words from a title of the electronic document. These specialized vocabulary words are respectively associated with vectors having a plurality of elements, each element indicating a tendency to a specific purpose of documents. The processor specifies a document purpose of the electronic document, based on an average of the vectors associated with the extracted specialized vocabulary words. The processor then determines a graph type, based on the document purpose, and generates a graph of the determined graph type, based on data of the electronic document.

8 Claims, 29 Drawing Sheets

(56) References Cited

U.S. PATENT DOCUMENTS

| | | | |
|---|---|---|---|
| 2003/0193502 A1* | 10/2003 | Patel | G06T 11/206 345/440 |
| 2005/0251383 A1* | 11/2005 | Murray | G06N 5/04 704/9 |
| 2008/0201636 A1* | 8/2008 | Fujiwara | G06F 17/2775 715/700 |
| 2008/0208840 A1* | 8/2008 | Zhang | G06F 17/278 |
| 2009/0287673 A1* | 11/2009 | Chronister | G06F 17/30994 |
| 2010/0005096 A1* | 1/2010 | Minagawa | G06K 9/2054 707/E17.039 |
| 2012/0096029 A1* | 4/2012 | Tamura | G06F 17/2765 707/772 |
| 2013/0103677 A1* | 4/2013 | Chakra | G06F 17/30994 707/723 |
| 2013/0339363 A1* | 12/2013 | Khosravy | G06F 17/246 707/740 |

OTHER PUBLICATIONS

Thorsten Joachims, A Probabilistic Analysis of the Rocchio Algorithm with TFIDF for Text Categorization, 1996, Accession Number: ADA307731, retrieved from <<oai.dtic.mil/oai/oai?verb=getRecord&metadataPrefix=html&identifier=ADA307731>>, accessed Jan. 4, 2016.*

Toshiro Uchiyama, Machine translation for Japanese Patent Publication 2009-277100A, 2009.*

Japanese Office Action mailed Jun. 21, 2016 for corresponding Japanese Patent Application No. 2012-286542, with Partial English Translation, 5 pages.

Monthly ASCII. PC, "Excel & 1-2-3 I want to do THIS using "table" and "graph"I", Japan, ASCII Corporation, Nov. 1, 2000, vol. 3, No. 11, pp. 36-47, Cited in Japanese OA mailed Jun. 21, 2016 for corresponding Japanese Application No. 2012-286542.

Tamura, Norio, "How to use Spreadsheet tutorial Calculate sales 4", Nikkei PC 21, Japan, Nikkei Business Publication, Inc., Aug. 1, 2000, vol. 5, No. 15, pp. 214-219, Cited in Japanese OA mailed Jun. 21, 2016 for corresponding Japanese Application No. 2012-286542.

Chinese Office Action issued on Sep. 14, 2016 for corresponding Chinese Application Patent No. 201310721998A, with English Translation, 19 pages.

Chinese Office Action issued on Dec. 30, 2016 for corresponding Chinese Patent Application No. 201310721998.X, with Partial English Translation, 15 pages.

* cited by examiner

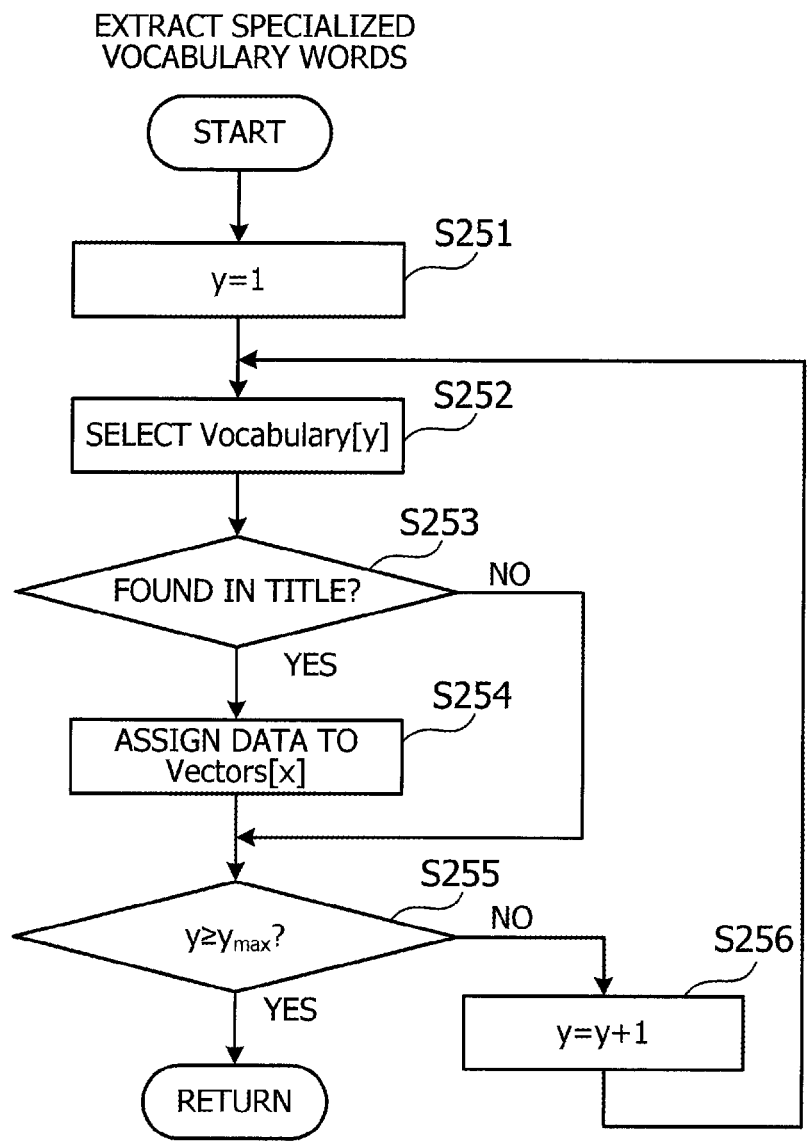

FIG. 18

TITLE: "Population Structure Trend"

⬇

| CHARACTER STRING | CLASSIFICATION VECTOR |
|---|---|
| structure | (0,1) |
| trend | (1,0) |

⬇

WEIGHTING $$V_i = v \times \left[ N \log \left( \frac{N}{N-i} \right) + 1 \right]$$

$N$: Number of specialized vocabulary words
$i$: Word position (0,1,2...)

⬇

$$Score = \frac{\sum V_i}{N}$$

⬇

TWO TERMS "structure" AND "trend" APPEAR IN THIS ORDER.
structure: (0,1)×[2×log(2/(2-0))+1]
trend: (1,0)×[2×log(2/(2-1))+1]
Score=((0,1)×1 + (1,0)×1.6) / 2 = (0.8,0.5)

⬇

0.8>0.5
(COMPARISON)

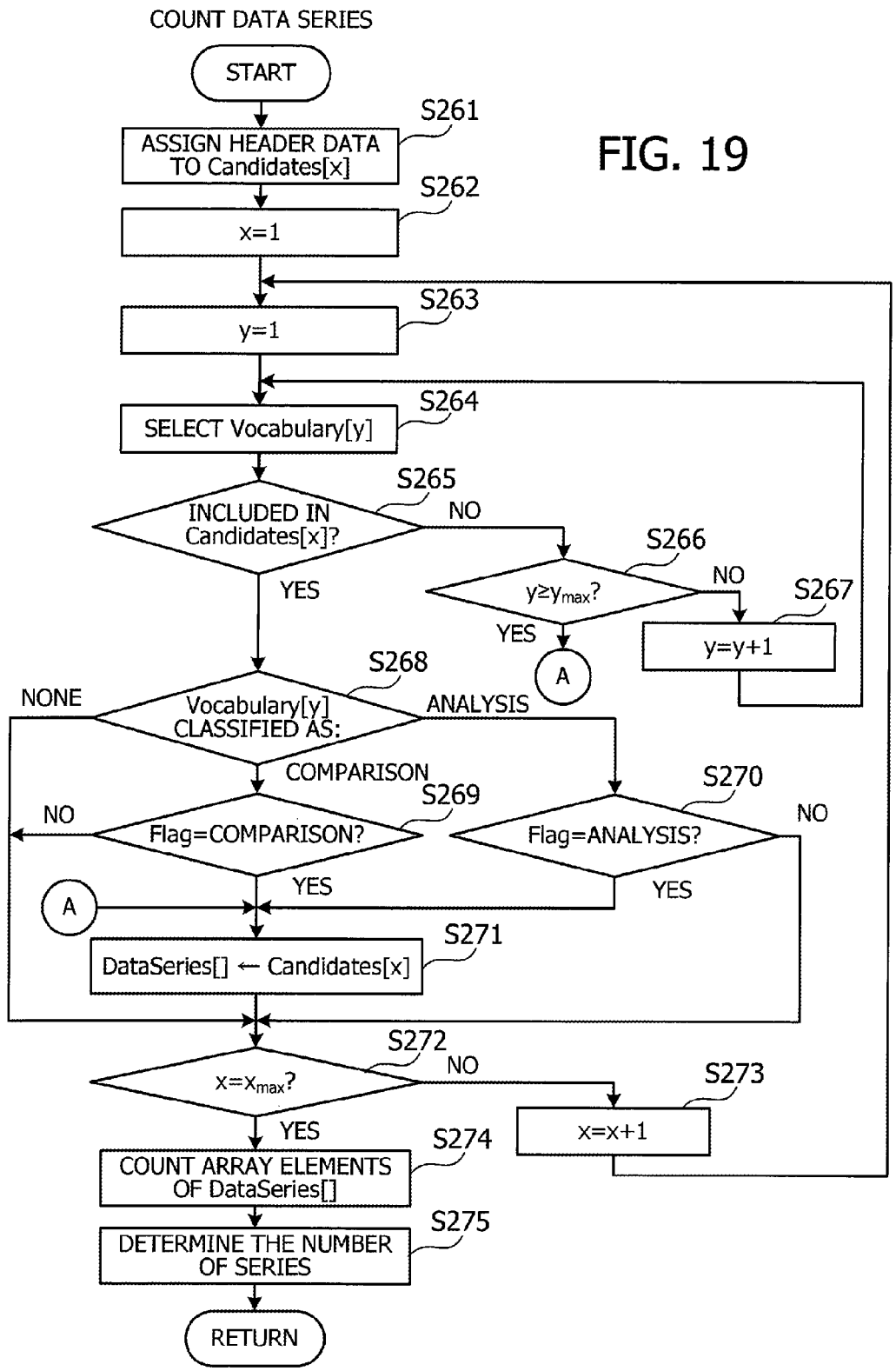

FIG. 20
Flag="COMPARISON"
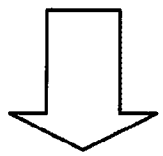
DATA SERIES      TABLE (DOCUMENT)
33
| Name | Target Amount | Sales Amount | Profit Rate |
|---|---|---|---|
| Tanaka | $20,000 | $18,000 | 20.2% |
| Suzuki | $40,000 | $62,000 | 16.4% |
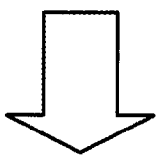
NUMBER OF DATA SERIES = 3

FIG. 25
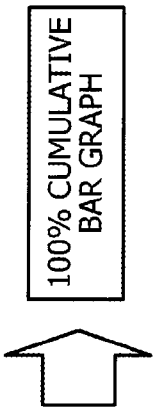
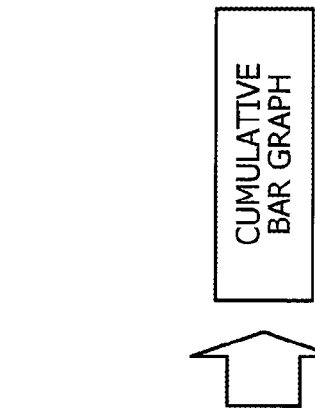
Sum of item values is 100 in all records
SouceData[x][y]
| QUARTER | GOOD | FAIR | BAD |
|---|---|---|---|
| Q1 | 50 | 30 | 20 |
| Q2 | 60 | 30 | 10 |
| Q3 | 60 | 35 | 5 |
| Q4 | 70 | 30 | 0 |
146a
| Sum[x] |
|---|
| 100 |
| 100 |
| 100 |
| 100 |
147a
⇒ 100% CUMULATIVE BAR GRAPH
Sum of item values is not 100 in at least one record
SouceData[x][y]
| QUARTER | GOOD | FAIR | BAD |
|---|---|---|---|
| Q1 | 10 | 35 | 2 |
| Q2 | 30 | 25 | 55 |
| Q3 | 33 | 13 | 36 |
| Q4 | 42 | 33 | 25 |
146b
| Sum[x] |
|---|
| 47 |
| 110 |
| 82 |
| 100 |
147b
⇒ CUMULATIVE BAR GRAPH

FIG. 27

Person-by-Person Monthly Statistics Table (Sales) —61

Output date: Aug 17, 2012 —62

| Person | Jan | Feb | Mar | Apr | May | Jun | Jul | Aug | Sep | Oct | Nov | Dec | Total |
|---|---|---|---|---|---|---|---|---|---|---|---|---|---|
| A | 2,301 | 2,140 | 5,420 | 2,301 | 1,507 | 1,702 | 2,301 | 2,301 | 2,301 | 2,301 | 2,301 | 2,301 | 29,177 |
| B | 3,420 | 2,670 | 3,420 | 640 | 3,420 | 3,200 | 3,012 | 2,860 | 5,017 | 8,715 | 10,138 | 477 | 46,989 |
| C | 10,442 | 20,442 | 1,468 | 10,442 | 3,643 | 5,043 | 1,065 | 1,651 | 528 | 1,218 | 1,412 | 855 | 58,209 |
| D | 1,026 | 2,032 | 2,346 | 4,500 | 75 | 4,500 | 1,026 | 2,055 | 1,026 | 1,026 | 274 | 1,026 | 20,912 |
| E | 5,140 | 1,757 | 5,464 | 1,934 | 1,999 | 2,059 | 1,488 | 5,140 | 5,140 | 1,715 | 588 | 5,680 | 38,104 |
| F | 1,270 | 2,090 | 1,270 | 1,270 | 1,270 | 49 | 89 | 5,590 | 1,566 | 1,270 | 1,440 | 1,640 | 18,814 |
| Total | 23,599 | 31,131 | 19,388 | 21,087 | 11,914 | 16,553 | 8,981 | 19,597 | 15,578 | 16,245 | 16,153 | 11,979 | 212,205 |

—63

GRAPH AREA —64

—60

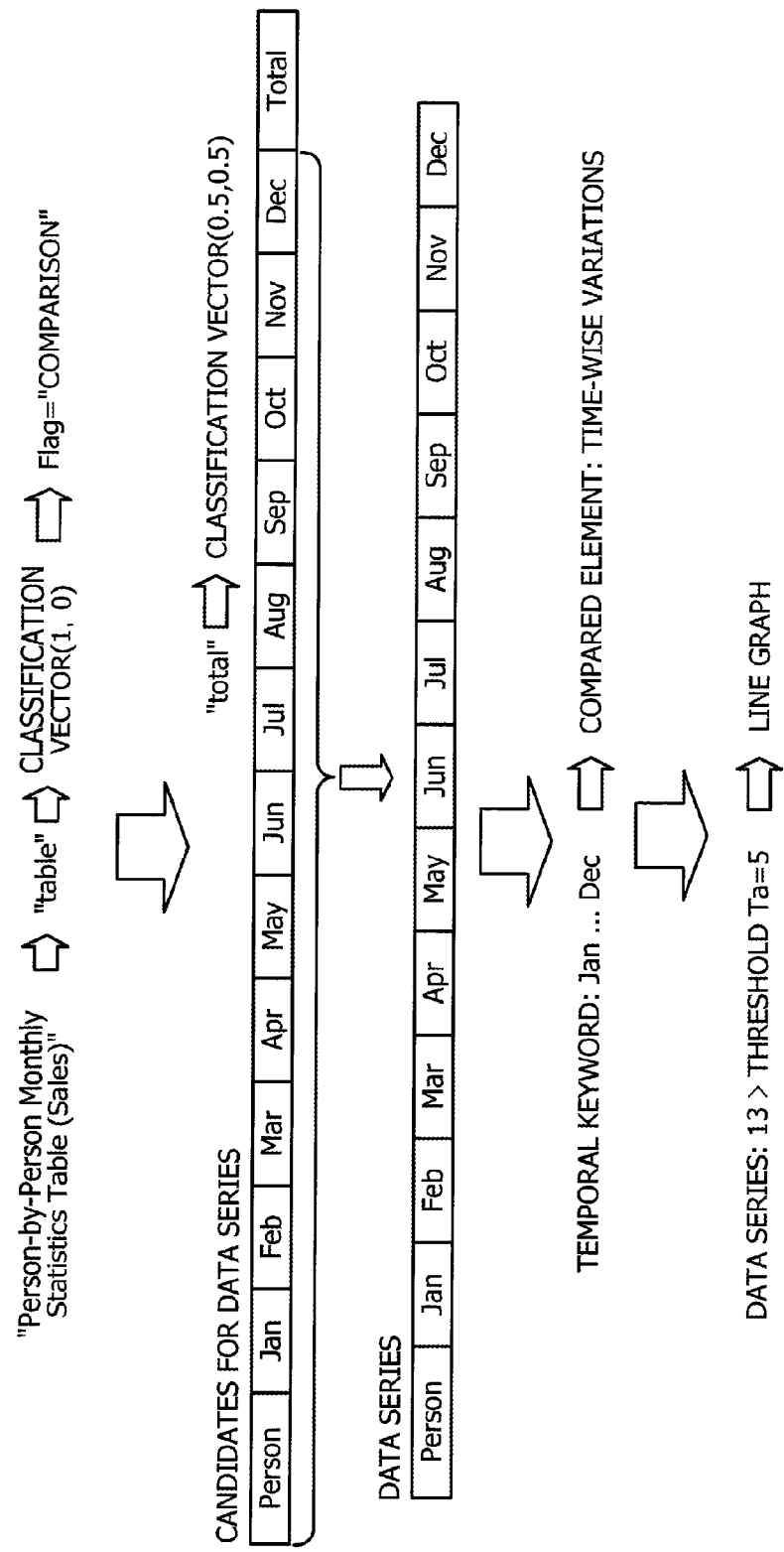

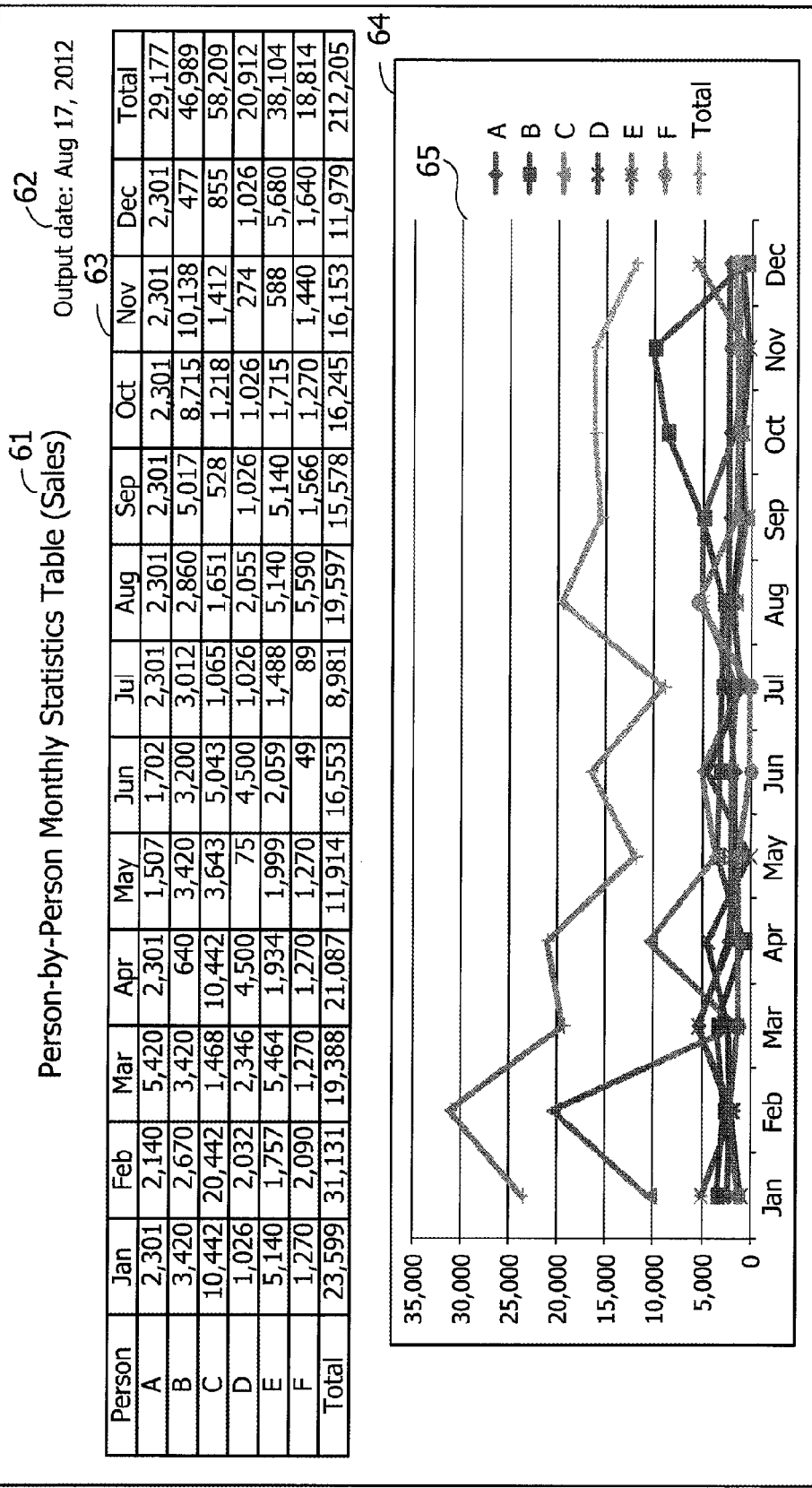

APPARATUS AND METHOD FOR AUTOMATICALLY DETERMINING GRAPH TYPES, BASED ON ANALYSIS OF ELECTRONIC DOCUMENT

CROSS-REFERENCE TO RELATED APPLICATION

This application is based upon and claims the benefit of priority of the prior Japanese Patent Application No. 2012-286542, filed on Dec. 28, 2012, the entire contents of which are incorporated herein by reference.

FIELD

The embodiments discussed herein relate to an information processing apparatus and a method for generating graphs.

BACKGROUND

Electronic documents may contain a graph to present some specific data in a visual way. To produce such an electronic document with a computer, the user may specify a type of graph and enter source data to the computer. In response, the computer generates a graph according to the user input by running a software program having graph generation functions.

The software used for graph generation may be, for example, spreadsheet applications. A spreadsheet program running on a computer enables the user to enter data in table form and produce a user-specified type of graph from the data table. Graphs may similarly be produced with other application software for designing and creating documents such as business forms. This software generates a graph from given source data and inserts the resulting graph into a document.

There is also proposed a document processing device that helps the user to create a diagram suitable for the purpose of his or her document, without any special knowledge about the format of such diagrams. The proposed device accepts user commands that specify the purpose of a diagram to be created, together with a set of rules describing how the diagram is to represent its content. In response, the document processing device determines appropriate color arrangement, object layout and decoration for the diagram. See, for example, Japanese Laid-open Patent Publication No. 2000-268112.

An electronic document such as a business form may include a bar graph, line graph, or other kind of charts, depending on the purpose of the document, i.e., what kind of information the graph is intended to deliver. For example, bar graphs may be selected when the user intends to provide comparison among a plurality of data values in terms of their magnitude. Line graphs may be intuitive in many cases when it is intended to depict the variations of two or more data items with time.

It has to be noted that, in the conventional techniques discussed above, the selection of which type of graph to generate is up to the user. This means, however, that the user does not always make a right choice of graphs. If a wrong type was specified, the resulting graph would be difficult to understand, the user would thus have to spend extra time to discard the useless graph and to create another graph by specifying a different graph type.

SUMMARY

According to one aspect of the embodiments to be discussed herein, there is provided a computer-readable non-transitory storage medium storing therein a graph generation program that causes a computer to perform a procedure including: determining a graph type by analyzing character strings to be presented in an electronic document; and generating a graph of the graph type based on data of the electronic document.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a flowchart illustrating an example of a vocabulary extraction process;

FIG. 18 illustrates an example of title-based classification of documents;

FIG. 19 is a flowchart illustrating how the number of data series is determined;

FIG. 20 illustrates an example of counting data series;

FIG. 25 illustrates an example of how to select a graph type based on the sum of data values;

FIGS. 27 to 29 are first to third diagrams illustrating a second example of how a document containing a graph is generated.

DESCRIPTION OF EMBODIMENTS

Several embodiments will be described below with reference to the accompanying drawings. These embodiments may be combined with each other, unless they have contradictory features.

(a) First Embodiment

Figure 1:
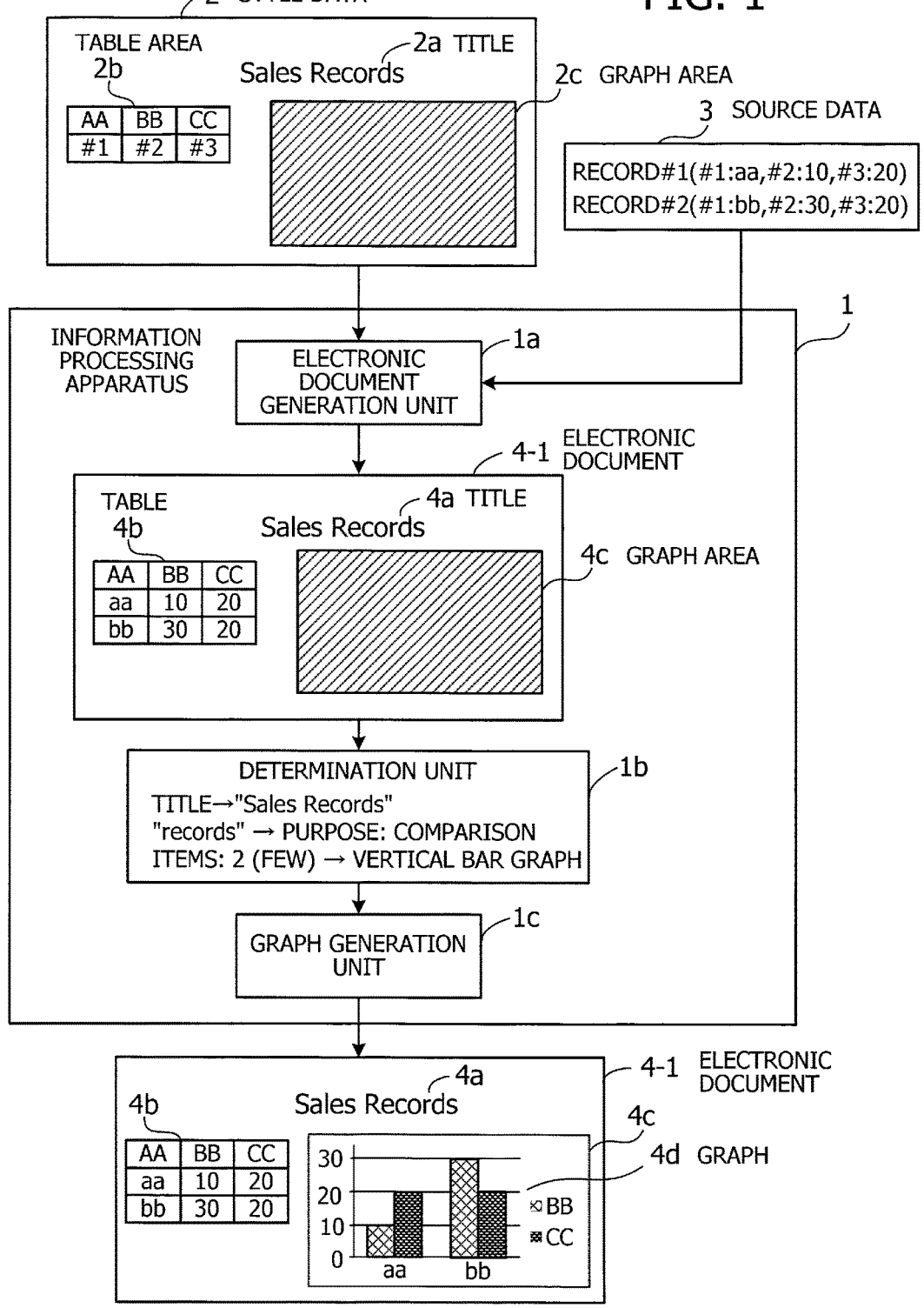
FIG. 1 illustrates an example of functional structure of an information processing apparatus according to a first embodiment.

FIG. 1 illustrates an example of functional structure of an information processing apparatus according to a first embodiment. The illustrated information processing apparatus 1 includes an electronic document generation unit 1a, a determination unit 1b, and a graph generation unit 1c.

The electronic document generation unit 1a is configured to generate a table 4b for an electronic document 4-1, based on source data 3 for the table 4b, as well as based on style data 2 that defines the appearance or style of such an electronic document 4-1 including a table. The electronic document generation unit 1a generates the electronic document 4-1 based on the style data 2. For example, the electronic document generation unit 1a inserts the generated table 4b into a table area 2b defined in the style data 2.

More specifically, the style data 2 includes definitions of a title 2a, table area 2b, graph area 2c, and other parameters, for use by the information processing apparatus 1 to produce an electronic document 4-1. The title 2a is a distinguishing name of the electronic document 4-1 to be produced. The table area 2b is an area defined in the electronic document 4-1 into which a table 4b will be inserted. The graph area 2c is another area in the electronic document 4-1 into which a graph 4d will be inserted. The style data 2 defines the table area 2b as a set of data fields, combined with information that indicates what kind of data is associated with those fields. For example, the source data 3 includes a plurality of records each formed from two or more data values. The style data 2 specifies which data item is assigned to which field of the table to be placed in the table area 2b. Referring to the example of FIG. 1, the table area 2b is defined to accommodate a table having the following three columns associated with source data values. The leftmost column titled "AA" is to contain the first data value (#1) of each record. The next column titled "BB" is to contain the second data value (#2) of each record. The rightmost column titled "CC" is to contain the third data value (#3) of each record. Such table area definitions permit the electronic document generation unit 1a to produce a table 4b by populating its data fields with the data values of each record in the source data 3.

The determination unit 1b analyzes character strings contained in the electronic document 4-1, thereby determining a graph type suitable for the electronic document 4-1. For example, the determination unit 1b first specifies a document purpose of the electronic document 4-1, i.e., for what purpose the electronic document 4-1 is to be produced, based on some character strings in the electronic document 4-1. The determination unit 1b then selects an appropriate type of graph that is suitable for the intended document purpose. More specifically, the determination unit 1b extracts specialized vocabulary words from the title 4a of the electronic document 4-1, assuming that the title 4a contains such character strings that represent, for example, what the electronic document 4-1 is intended for. Based on the extracted specialized vocabulary words, the determination unit 1b specifies the document purpose of the electronic document 4-1, which may be, for example, comparison of data or analysis of data.

The determination unit 1b may also rely on other parameters, such as the number of data series or the number of items to determine the type of the graph 4d. The former parameter (i.e., the number of data series) denotes how many kinds of data is to be depicted in the graph 4d. The latter parameter (i.e., the number of items) denotes how many data values are grouped into a single kind of data, or data series. These parameters are obtained from the definitions of the table 4b in the electronic document 4-1. The determination unit 1b may use both the number of data series and the number of items to determine the graph type. Note that the data contained in the table 4b may be grouped into a plurality of rows of data or columns of data. The term "data series" refers to, for example, all or some of those data groups in the table 4b that fit the document purpose of the electronic document 4-1.

The graph generation unit 1c generates a graph 4d of the selected type, based on data in the electronic document 4-1. The graph generation unit 1c may further insert the generated graph 4d into a graph area 4c of the electronic document 4-1, which is produced with the style data 2 described above. The graph generation unit 1d then outputs the resulting electronic document 4-1 containing the graph 4d.

In operation of the information processing apparatus 1 described above, an electronic document 4-1 is produced from given style data 2 and source data 3. Referring to the example of FIG. 1, this electronic document 4-1 is titled "Sales Records" and contains a table 4b with a size of three columns by three rows. The table 4b has two items named "aa" and "bb." The title and the number of items of this table 4b are referenced by the determination unit 1b when it determines which type of graph to generate. It is assumed, for example, that the term "records" is a specialized vocabulary word suggesting that the electronic document 4-1 is for the purpose of data comparison. Since the title 4a includes this term "records" in its character string, the determination unit 1b determines that the electronic document 4-1 in question is intended for "comparison" of some data. The determination unit 1b also compares the number of items with a specified threshold. It is assumed in the example of FIG. 1 that the number of items does not exceed the threshold. The determination unit 1b then selects an appropriate type of graph that not only fits the purpose of data comparison, but also is suitable for such a small number of items. In the example of FIG. 1, the determination unit 1b selects a vertical bar graph for the electronic document 4-1.

With the selection of a specific graph type, the graph generation unit 1c generates a graph 4d based on, for example, the source data provided in the table 4b. The generated graph 4d is inserted into a graph area 4c of the electronic document 4-1. The resulting electronic document 4-1 with the graph 4d may be output to a printer to produce one or more copies on physical media. The final electronic document 4-1 with the graph 4d may also be sent to a storage device.

As can be seen from the above description, the first embodiment is designed to select an appropriate type of graph for an electronic document 4-1 on the basis of character strings contained in the document. The proposed information processing apparatus 1 of the first embodiment avoids producing unsuitable graphs and makes it possible to provide a graph that effectively communicates the content of the document to the user.

For example, the above-described electronic document generation unit 1a, determination unit 1b, graph generation unit 1c may be implemented as part of the functions of a processor in the information processing apparatus 1. It is noted that the lines interconnecting the functional blocks in FIG. 1 are only an example. FIG. 1 omits some communication paths for simplicity purposes. The person skilled in the art would appreciate that there may be other communication paths in actual implementations.

(b) Second Embodiment

This section describes a second embodiment, in which a server produces documents representing source data by using a document style form provided from a terminal device. The second embodiment enables the server to select an appropriate type of graph when producing a document. Here the term "document" is used as an example of the electronic document 4-1 discussed in the first embodiment.

Figure 2:
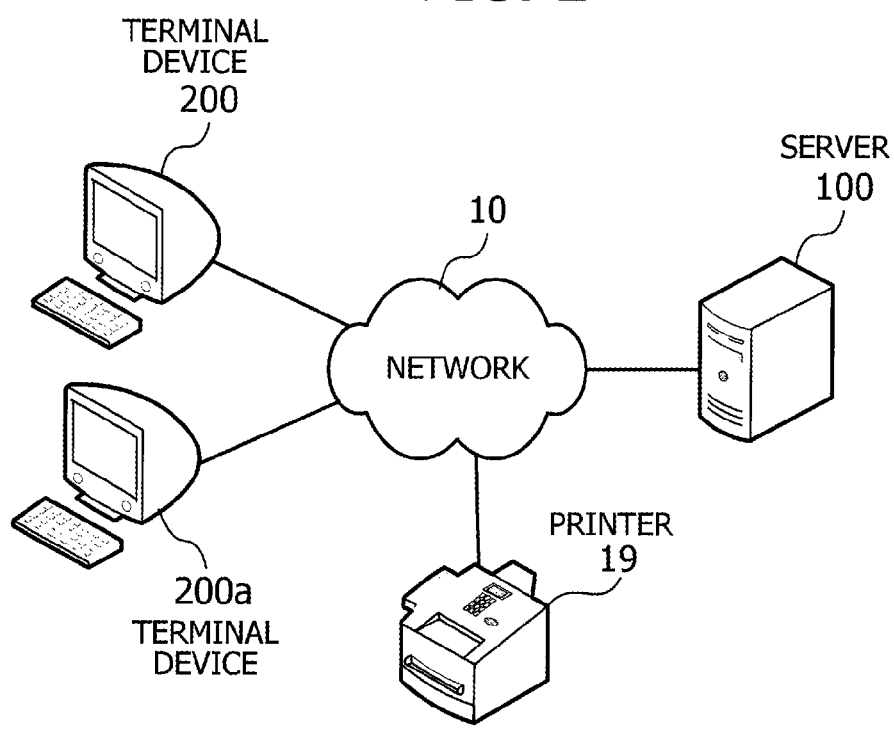
FIG. 2 illustrates an example of system configuration according to a second embodiment.

FIG. 2 illustrates an example of system configuration according to the second embodiment. In this system, a plurality of terminal devices 200 and 200a are connected to a server 100 via a network 10, and a printer 19 is attached to the network 10.

The terminal device 200 and 200a are computers used to create document styles and enter source data for the server 100. For example, one user creates a document style form with his or her terminal device 200 and sends it to the server 100. Another user enters and sends source data to the server 100 via his or her terminal device 200a.

The server 100 is a computer configured to generate documents for users. For example, the server 100 receives and stores document style and source data. With the stored document style and source data, the server 100 produces a document according to user commands sent from the terminal devices 200 and 200a. The server 100 may transmit a print command to the printer 19, together with document data representing the produced document. The printer 19 then prints out the document as requested.

The server 100 may also be capable of automatically generating graphs as part of a document. The server 100 determines which type of graph is suitable for the document to be generated, by consulting the document style form and source data.

Figure 3:
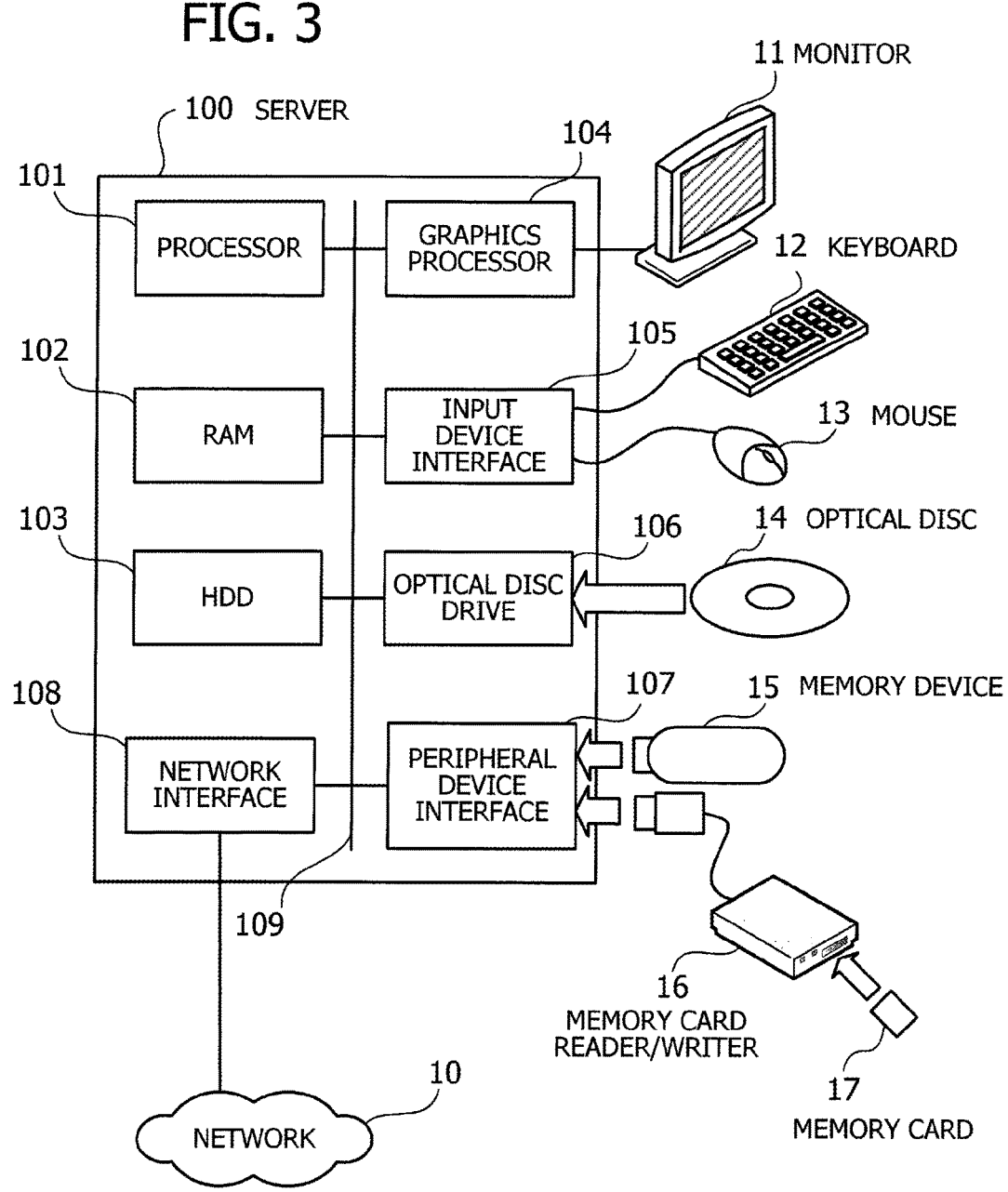
FIG. 3 illustrates an example of hardware configuration of a server in the second embodiment.

To provide the functions noted above, the server 100 may have a hardware configuration described below. FIG. 3 illustrates an example of hardware configuration of a server in the second embodiment. The illustrated server 100 has a processor 101 to control its entire operation. This processor 101 is connected to a random access memory (RAM) 102 and various devices and interfaces on a bus 109. The processor 101 may be a single processing device or a multiprocessor system including two or more processing devices. Specifically, the processor 101 may be, for example, a central processing unit (CPU), micro processing unit (MPU), or digital signal processor (DSP). It is further noted that the processing functions of the processor 101 may be executed wholly or partly by an application-specific integrated circuit (ASIC), programmable logic device (PLD), or other electronic circuits, or their combinations. The term "processor" is used to collectively refer to those devices.

The RAM 102 serves as primary storage of the server 100. Specifically, the RAM 102 is used to temporarily store at least some of the operating system (OS) programs and application programs that the processor 101 executes, in addition to other various data objects that it manipulates at runtime. Other devices on the bus 109 are a hard disk drive (HDD) 103, a graphics processor 104, an input device interface 105, an optical disc drive 106, a peripheral device interface 107, and a network interface 108.

The HDD 103 writes and reads data magnetically on its internal platters. The HDD 103 serves as secondary storage of the server 100 to store program and data files of the operating system and applications. Flash memory and other semiconductor memory devices may also be used as secondary storage.

The graphics processor 104, coupled to a monitor 11, produces video images in accordance with drawing commands from the processor 101 and displays them on a screen of the monitor 11. The monitor 11 may be, for example, a cathode ray tube (CRT) display or a liquid crystal display.

The input device interface 105 is connected to input devices such as a keyboard 12 and a mouse 13 and supplies signals from those devices to the processor 101. The mouse 13 is a pointing device, which may be replaced with other kinds of pointing devices such as touchscreen, tablet, touchpad, and trackball.

The optical disc drive 106 reads out data encoded on an optical disc 14, by using laser light. The optical disc 14 is a portable data storage medium, the data recorded on which can be read as a reflection of light or the lack of the same. The optical disc 14 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the server 100. For example, the peripheral device interface 107 may be used to connect a memory device 15 and a memory card reader/writer 16. The memory device 15 is a data storage medium having a capability to communicate with the peripheral device interface 107. The memory card reader/writer 16 is an adapter used to write data to or read data from a memory card 17, which is a data storage medium in the form of a small card.

The network interface 108 is connected to a network 10. The processor 101 can exchange data with other computers or communication devices (not illustrated) over the network 10.

The above-described hardware platform may be used to realize the processing functions of the second embodiment. While FIG. 3 illustrates a hardware structure of the server 100, the same structure can similarly be applied to the terminal devices 200 and 200a. The information processing apparatus 1 of the foregoing first embodiment may also be implemented with the hardware illustrated in FIG. 3.

The server 100 provides various processing functions of the second embodiment by executing programs stored in, for example, a computer-readable non-transitory storage medium. The programs for the server 100 may be stored in various computer-readable media. For example, such program files may be stored in the HDD 103. The processor 101 loads the RAM 102 with at least part of those program files read out of the HDD 103 and executes the programs on the RAM 102. Computer-readable media for storage of programs include optical discs 14, memory devices 15, memory cards 17, and other portable storage media. The programs stored in such a portable storage medium are installed in the HDD 103 under the control of the processor 101, so that they are ready to execute upon request. Where appropriate, the processor 101 may execute program code read out of a portable storage medium, without installing them in its local storage device.

Figure 4:
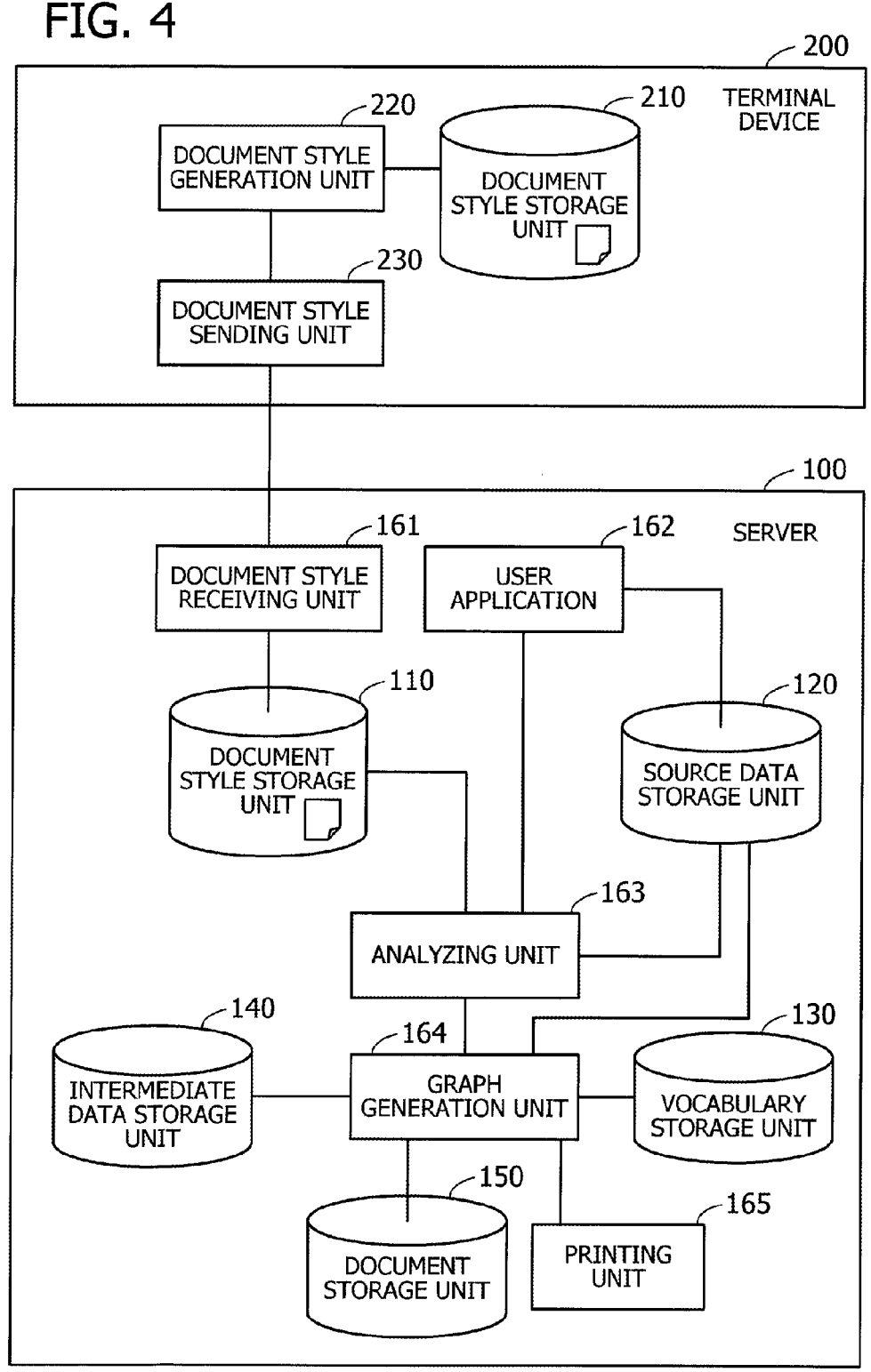
FIG. 4 is a functional block diagram of the second embodiment.

To generate documents including a graph, the apparatuses in the second embodiment are configured to provide the functions described below. FIG. 4 is a functional block diagram of the second embodiment. The illustrated terminal device 200 includes a document style storage unit 210, a document style generation unit 220, and a document style sending unit 230 to produce a document style form.

The document style storage unit 210 provides a storage space for document style data produced at the document style generation unit 220 described below. For example, the document style storage unit 210 may be implemented as part of RAM or HDD in the terminal device 200.

The document style generation unit 220 is configured to produce a document style form according to user inputs. For example, the document style generation unit 220 permits the user to edit text, drawings, tables, and other objects. Through the interaction with the user, the document style generation unit 220 places a title, table area, graph area, and the like within a specified sheet space. For example, the document style generation unit 220 may assign column titles and item names to a table. A column title is a distinguishing name that designates a set of data values of a particular kind. For example, character strings such as "name" and "target amount" may be assigned as column titles. The item name is a distinguishing name of a record composed of one ore more data values. The document style generation unit 220 also defines how each cell in the table is associated with source data. The document style generation unit 220 permits the user to define attributes of source data that is to be entered to specified cells in the table. This attribute information indicates, for example, whether the source data values in question are character strings or numerical values.

The document style generation unit 220 may store the produced data of document style in the document style storage unit 210. This is referred to as the document style data. The document style generation unit 220 may pass the document style data to the document style sending unit 230 in order to make the server 100 keep a copy of the document style data. The document style sending unit 230 is configured to transmit the produced document style data to the server 100.

The illustrated server 100 includes the following components: a document style storage unit 110, a source data storage unit 120, a vocabulary storage unit 130, an intermediate data storage unit 140, a document storage unit 150, a document style receiving unit 161, a user application 162, an analyzing unit 163, a graph generation unit 164, and a printing unit 165. The source data storage unit 120, vocabulary storage unit 130, intermediate data storage unit 140, and document storage unit 150 are implemented as part of the storage space of, for example, RAM 102 or HDD 103.

The document style storage unit 110 is configured to store a copy of document style data produced in the terminal device 200. The source data storage unit 120 is configured to store source data received through a user application 162. For example, source data is used to populate a table in a document, as well as to generate a graph in the same.

The vocabulary storage unit 130 is configured to store a specialized vocabulary, i.e., a set of words and phrases that can be used to specify the purpose of graphs. In this vocabulary storage unit 130, each record of vocabulary includes some related information for determining the purpose of documents containing a specific specialized vocabulary word. It is noted here that the scope of the term "specialized vocabulary words" is not limited to single-word expressions, but includes phrases composed of two or more words.

The intermediate data storage unit 140 is configured to store intermediate data that the graph generation unit 164 produces during the process of document generation. The document storage unit 150 is configured to store document data of generated documents.

The document style receiving unit 161 is configured to receive document style data from the terminal device 200 and store the received document style data in the document style storage unit 110.

The user application 162 accepts entry of data of documents, as well as commands for outputting documents, from the user. For example, the user application 162 may receive such data and commands from terminal devices 200 and 200a connected to the server 100 via a network 10. The user application 162 may also command the analyzing unit 163 to output a document in response to a user input. When data for a document is received, the user application 162 stores the received data as source data in the source data storage unit 120.

The analyzing unit 163 is configured to analyze document style data and source data of a document in response to an output command that the user application 162 issues for that document from. For example, the output command specifies document style data and source data for a document including a table area. The analyzing unit 163 retrieves the specified document style data from the document style storage unit 110 and then analyzes the retrieved data to determine with which part of source data to populate the table area. The analyzing unit 163 retrieves the determined part of the source data from the source data storage unit 120, analyzes the retrieved source data, and populates the table area by placing data values in appropriate cells. The analyzing unit 163 supplies the graph generation unit 164 with the analysis result of document style data, together with the source data.

The graph generation unit 164 is configured to generate a graph for the document, based on given document style data and source data. For example, the document style data indicates a specific layout of objects including a graph area. To generate a graph, the graph generation unit 164 first determies the document purpose by using the specialized vocabulary stored in the vocabulary storage unit 130. The graph generation unit 164 then selects an appropriate type of graph suitable for the specified document purpose and generates a graph of the selected type from the source data. During this course, the graph generation unit 164 may determine "data series" in the document based on its purpose specified above. The term "data series" refers to a collection of data values in a single category, such as those under the column title of "target amount" or "sales amount." Suppose, for example, that the document is for the purpose of visualizing the performance of individual sales persons. In this case, the source data includes the names of sales persons and the values representing their sales records such as "target amount" and "sales amount." The names of sales persons are handled as "item names" while the sales records are treated as the values of "data series."

After generating a graph in the way discussed above, the graph generation unit 164 outputs document data representing a document containing the generated graph. For example, the graph generation unit 164 stores the produced document data in the document storage unit 150. In addition to that, the graph generation unit 164 may output the document data to the printing unit 165. The printing unit 165 prints out the document according to the received document data. For example, the printing unit 165 issues a print command to a printer 19 on the network 10, besides sending the document data to the same. The printer 19 outputs a printed copy of the document accordingly.

The proposed system enables the user to produce a document automatically with the aid of the server 100. It is noted that the lines interconnecting the functional blocks in FIG. 4 are only an example. The person skilled in the art would appreciate that there may be other communication paths in actual implementations. The analyzing unit 163 in FIG. 4 is an example of the electronic document generation unit 1*a* discussed previously in FIG. 1 for the first embodiment. Further, the graph generation unit 164 in FIG. 4 provides the functions of both the determination unit 1*b* and graph generation unit 1*c* discussed previously in the same.

Figure 5:
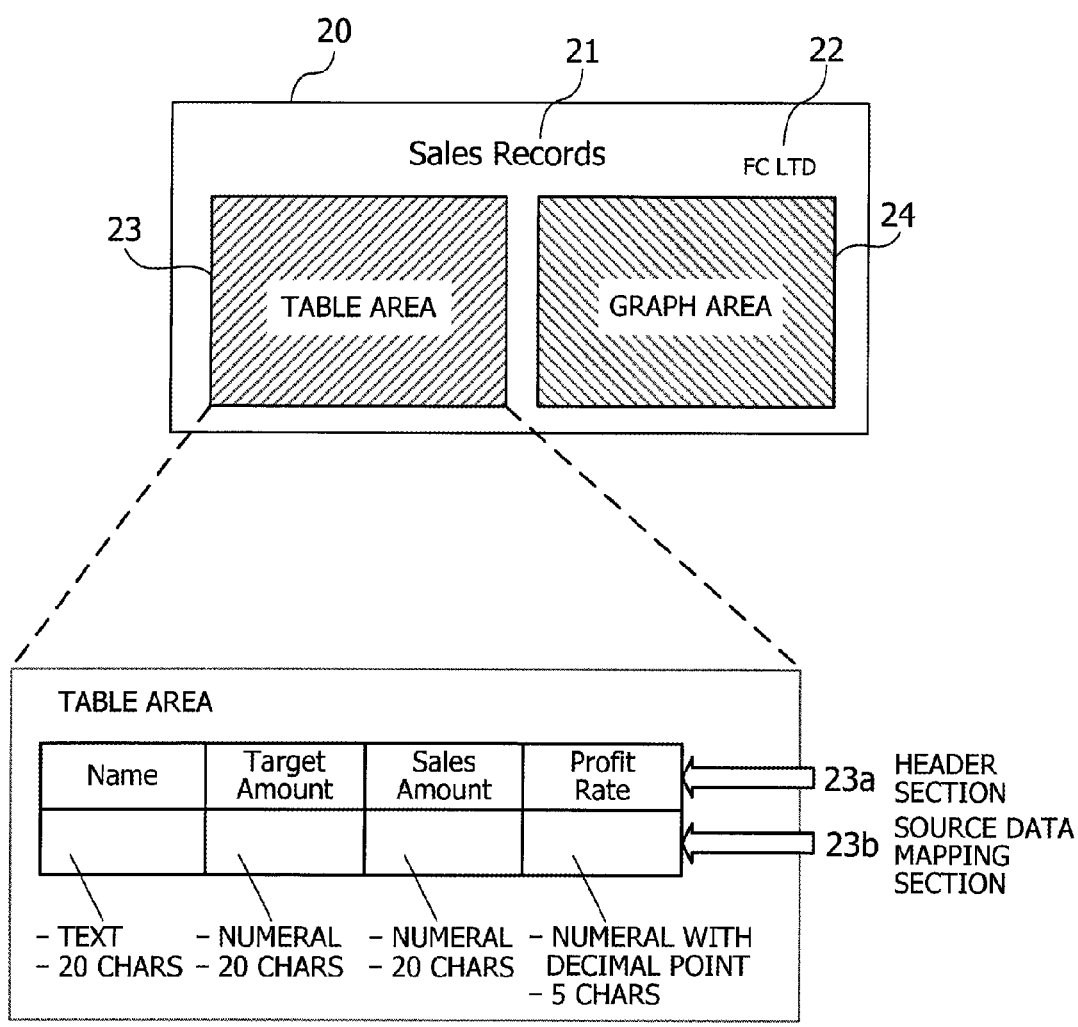
FIG. 5 illustrates an example of a document style form.

The description will now focus on the features of document styles. FIG. 5 illustrates an example of a document style form. The illustrated document style form 20 includes a title 21, an author name 22, a table area 23, and a graph area 24.

The title 21 is a character string that indicates the subject of the document to be generated. The author name 22 is a character string that indicates who (person or organization) has produced this document. The table area 23 is where a table is to be inserted. This table area 23 may be formed from, for example, a header section 23*a* and a source data mapping section 23*b*. The header section 23*a* is the first row of the table, made up of a plurality of character strings indicating the type of data values in each corresponding column of the table. The source data mapping section 23*b* is where the data values in source data will be mapped on their corresponding columns according to their data types indicated by the header section 23*a*. Some additional information may be assigned to the source data mapping section 23*b* to specify the attributes of data values in each column distinguished by the header section 23*a*. For example, one attribute indicates whether the data value in question is a character string or a number. Another attribute gives the data length in units of characters. The document style form 20 also defines a graph area 24 where a graph is to be inserted.

Figure 6:
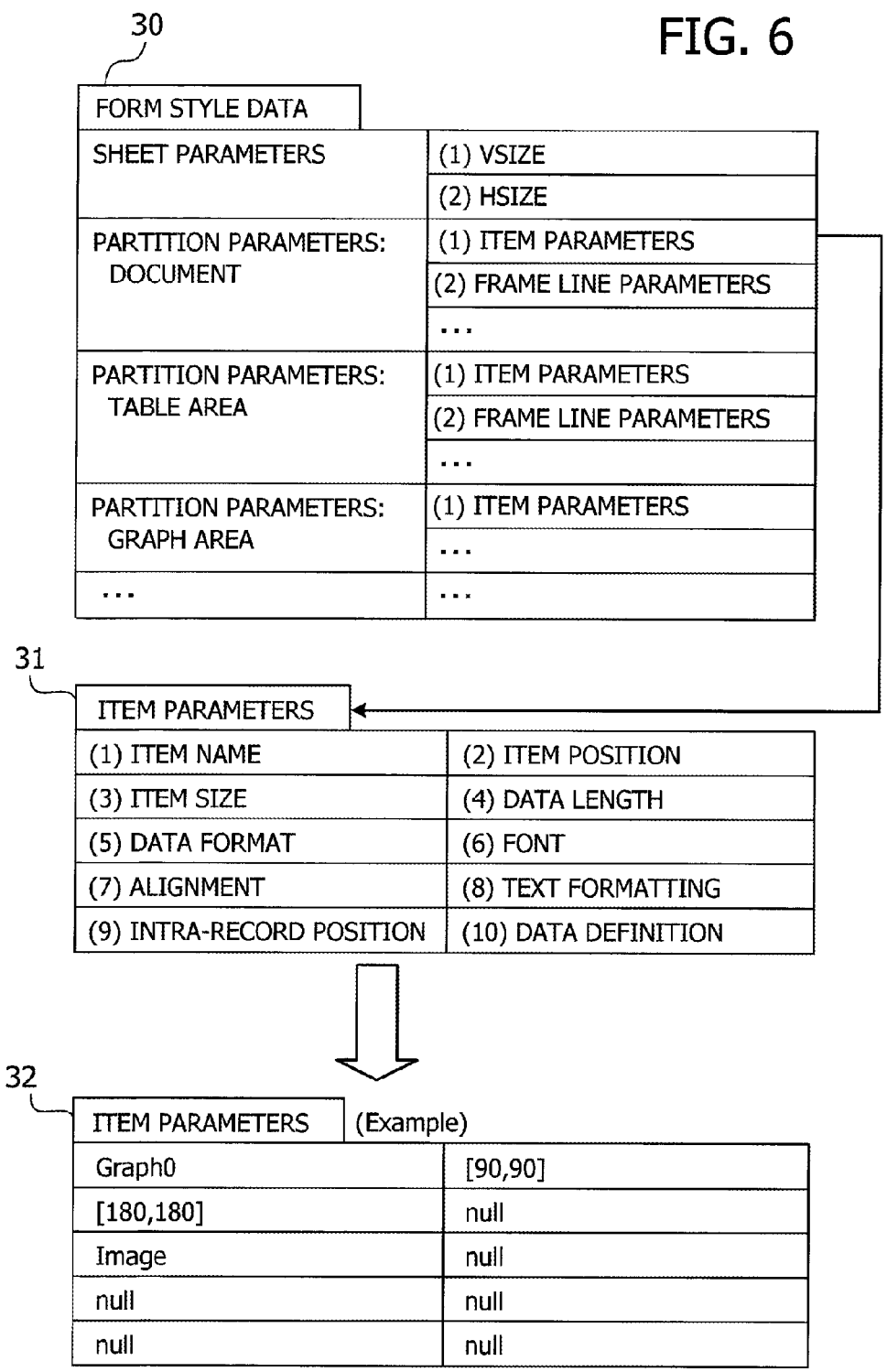
FIG. 6 illustrates an example of data structure of document style data.

The document style form 20 described above is transmitted to the server 100 as document style data. The server 100 stores the received document style data in its local document style storage unit 110. FIG. 6 illustrates an example of data structure of document style data. The illustrated document style data 30 includes sheet parameters and a plurality of sets of partition parameters. The sheet parameters include the vertical size and horizontal size of a sheet of paper to be used.

The partition parameters describe a plurality of areas, or partitions, into which the document is divided. For example, the partition parameters include those describing the document as a whole, those describing a table area, and those describing a graph area. Each of these groups of partition parameters may include, for example, item data and frame line data. Item data describes items to be contained in a partition. Frame line parameters describe frame lines to be drawn in a partition.

For example, item parameters 31 are actually the following parameters about a particular item: item name, item position, item size, data length, data format, font, alignment, text formatting, intra-record position, and data definition. The item name parameter gives a uniquely distinguishing name of the item. The item position parameter contains the coordinates indicating where the item is located. The item size parameter indicates a space occupied by the item (e.g., width and height of the item's space at the item position). The data length parameter indicates the length (e.g., the number of bits) of the item data. The data format parameter indicates what kind of data (e.g., character strings, numerals) the item is. The font parameter specifies the name and size of the font used to display the item value. The alignment parameter specifies the alignment (e.g., centered) of a character string used to display the item value. The text formatting parameter specifies the formatting (e.g., italic, bold) of text. The intra-record position parameter associates the item with a particular part of source data. For example, a record of source data may be provided in the Comma-separated Values (CSV) format. That is, the data values of a record are separated by commas. The intra-record position parameter indicates to what number data value in the source data record the item corresponds. The data definition parameter contains substantive data of the item. For example, the data definition parameter contains a specific character string when the item is defined to be of that kind. FIG. 6 illustrates an example of such item parameters 32, which include specific values of the item name parameter, item position parameter, item size parameter, and data format parameter described above.

The above-described document style data 30 is used by the server 100 to produce a document. When the document style form 20 includes a graph area 24, the server 100 generates a graph on the basis of the document style data 30 and source data. Specialized vocabulary words registered in the vocabulary storage unit 130 are used here to select a specific graph type.

Figure 7:
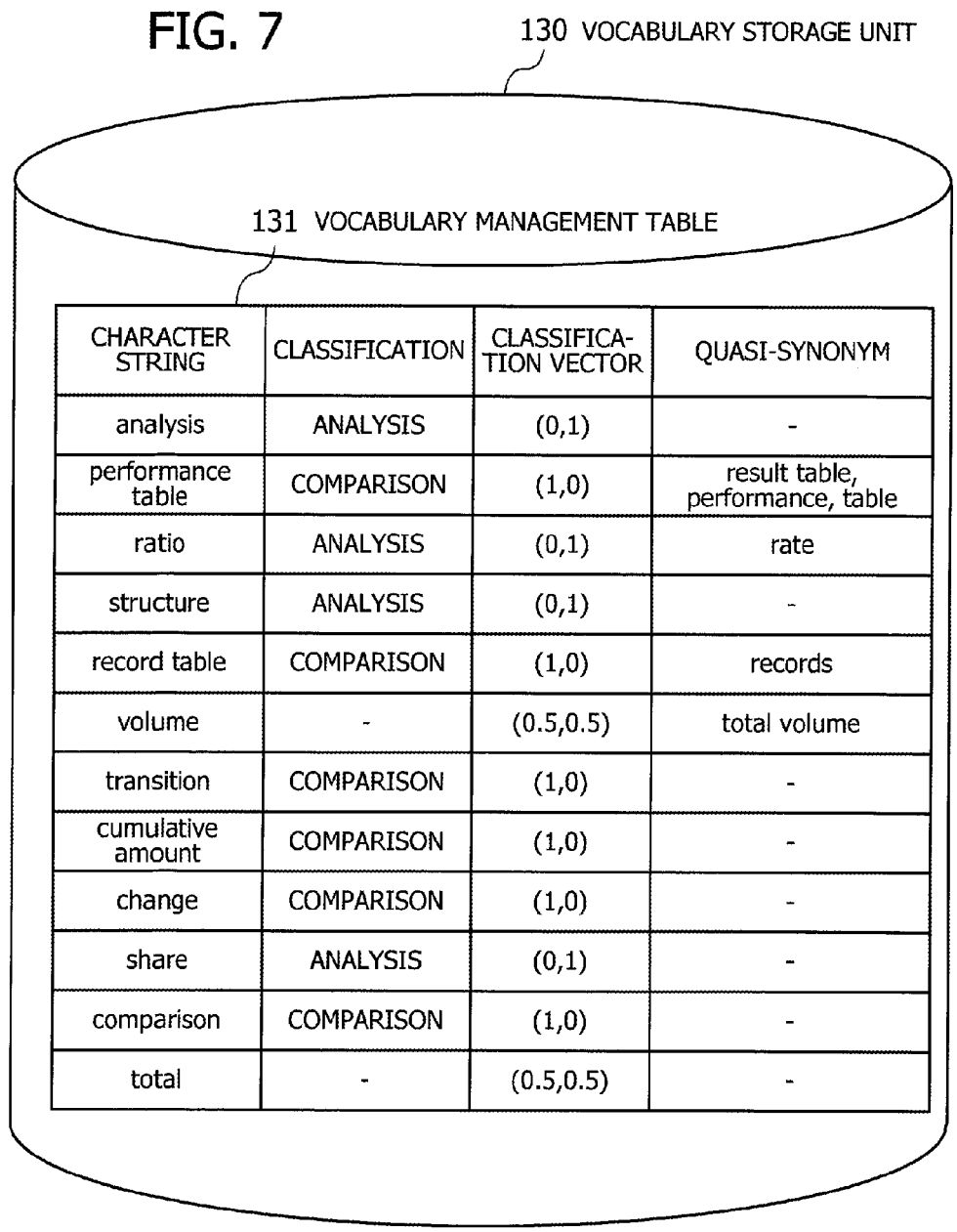
FIG. 7 illustrates an example of data structure of a vocabulary storage unit.

FIG. 7 illustrates an example of data structure of the vocabulary storage unit 130. In this example, the vocabulary storage unit 130 stores a vocabulary management table 131 formed from a plurality of records each corresponding to a particular specialized vocabulary word.

Specifically, the vocabulary management table 131 has the following data fields: "Character String," "Classification," "Classification Vector," and "Quasi-Synonym." The character string field contains a character string that is regarded as a specialized vocabulary word. The classification field indicates whether the specialized vocabulary word suggests "analysis" of data or "comparison" of data. For example, if a document contains specialized vocabulary words classified as "analysis," it means that the document is intended for data analysis. An appropriate graph type is then selected for the purpose of data analysis. The classification vector field contains a vector that represents how much the specialized vocabulary word is associated with each of the two concepts, "analysis" and "comparison." This vector is referred to as a "classification vector." In the example of FIG. 7, the first component of the illustrated classification vector represents the specialized vocabulary word's tendency to "comparison," while the second component represents that to "analysis." Each component of a classification vector takes a real-number value in the range of zero to 1. The quasi-synonym field contains one or more terms whose meaning is similar to the specialized vocabulary word. A specialized vocabulary word and its quasi-synonyms are supposed to be classified in the same way and thus have the same classification vector.

Some specialized vocabulary words are used to imply both comparison and analysis with equal weights. For these specialized vocabulary words, the classification vector field of the vocabulary management table 131 is given a value of (0.5, 0.5), and the classification vector filed is left blank. The user may edit the vocabulary management table 131 for registration of new specialized vocabulary words, as well as deletion and editing of existing ones.

Figure 8:
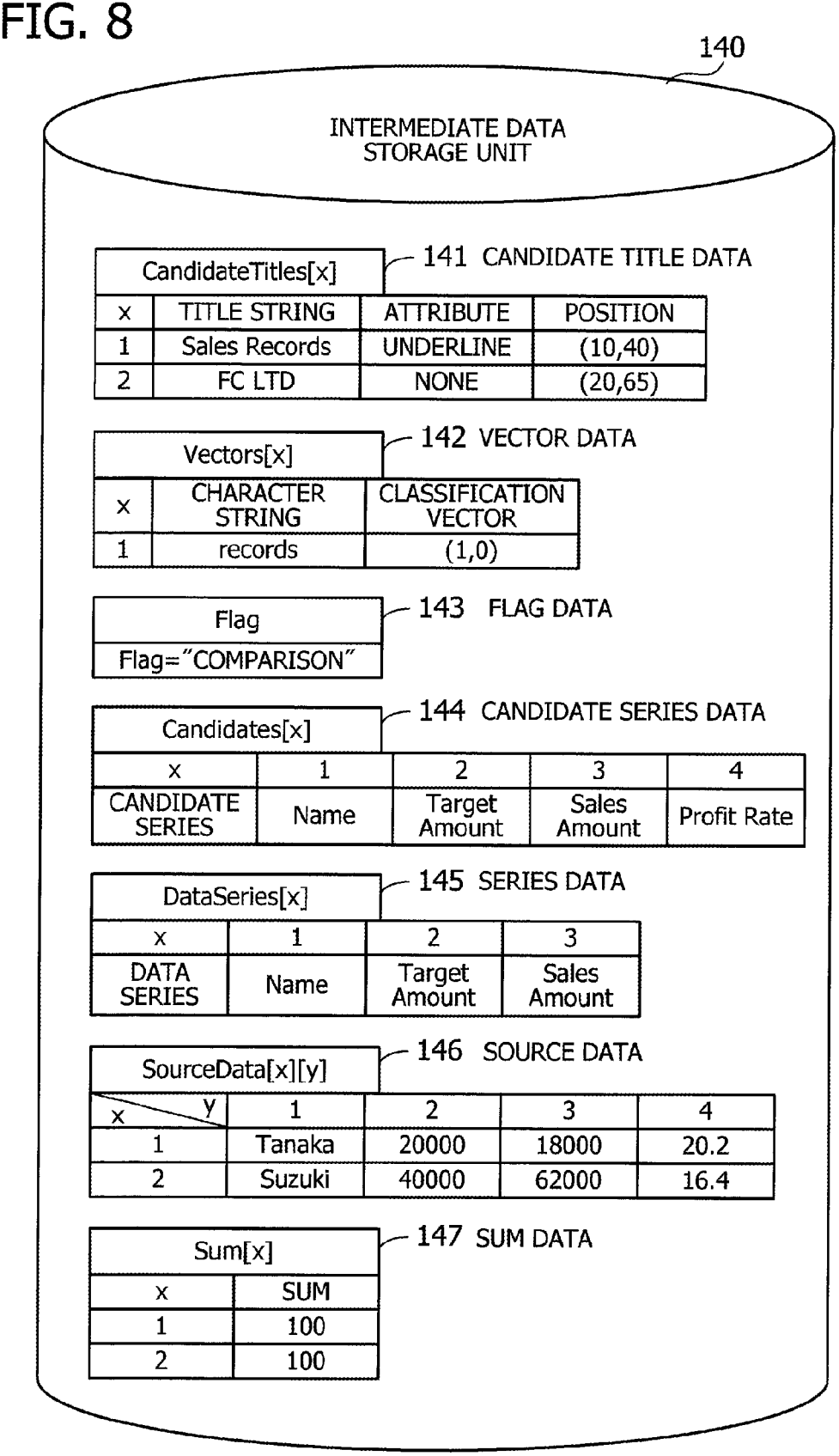
FIG. 8 illustrates an example of data structure of an intermediate data storage unit.

The intermediate data storage unit 140 stores the following data. Specifically, FIG. 8 illustrates an example of data structure of the intermediate data storage unit 140. The intermediate data storage unit 140 is used to store various data produced or referenced during the course of generating a graph, which are: candidate title data 141, vector data 142, flag data 143, candidate series data 144, series data 145, source data 146, and sum data 147.

The candidate title data 141 describes character strings extracted from the document as candidates for the title. Specifically, each registered record of this candidate title data 141 is formed from the following data fields to describe a candidate: title string, attribute, and position. The title string field contains a character string that may possibly be the title of the document. The attribute field indicates some optional styles applied to the character string of the candidate, and the position field indicates the position of the character string within the document. Every candidate title registered in the candidate title data 141 is serial numbered. More specifically, array CandidateTitles[ ] is indexed by the serial number, so that a particular candidate for the title can be retrieved from the intermediate data storage unit 140 by specifying its serial number.

The vector data 142 includes one or more classification vectors of specialized vocabulary words included in each candidate title. More specifically, each registered record of the vector data 142 includes the character string and classification vector of a specialized vocabulary word. Here the specialized vocabulary words are serial numbered, and array Vectors[ ] is indexed by the serial number, so that the classification vector of a particular specialized vocabulary word can be retrieved from the intermediate data storage unit 140 by specifying its serial number.

The flag data 143 gives a flag that indicates the purpose of the document, which is determined on the basis of the title. As described previously, documents may be classified by their purposes. In the second embodiment, the flag in the flag data 143 takes a value of either "comparison" or "analysis." When it is set to "comparison," the flag means that the document is to be produced for the purpose of comparison of some data. When it is set to "analysis," the flag means that the document is to be produced for the purpose of analysis of some data. While FIG. 8 illustrates a flag value of "comparison" as an example, the flag may be configured to take, for example, a binary value of zero or one to represent the purpose of "comparison" or "analysis," respectively.

The candidate series data 144 indicates candidates for the data series in a graph to be generated. The candidate series data 144 may actually include one or more character strings of such candidates. Each candidate registered in the candidate series data 144 is serial numbered. Array Candidates[ ] is indexed by the serial number of candidates, so that a particular candidate can be retrieved from the intermediate data storage unit 140 by specifying its serial number.

The series data 145 indicates the data series in a graph to be generated. The series data 145 may include one or more character strings of such data series. Each data series registered in the series data 145 is serial numbered. Array DataSeries[ ] is indexed by the serial number of data series, so that a particular data series can be retrieved from the intermediate data storage unit 140 by specifying its serial number.

The source data 146 is a set of data values to be visualized in graph form. Specifically, the source data 146 may be a subset of the original source data stored in the source data storage unit 120 which is extracted when generating a graph. The records of the extracted source data are serial numbered, as are the data elements in each record. Two-dimensional array SourceData[ ][ ] is indexed by the record number and intra-record data number, so that a particular data element in a particular record can be retrieved from the intermediate data storage unit 140 by specifying these numbers.

The sum data 147 is a collection of values each representing the sum of data values constituting a record in the source data 146 described above. Each element of this sum data 147 is given the same record number as the source data 146. Array Sum[ ] is indexed by the record number, so that the sum value of a particular record can be retrieved from the intermediate data storage unit 140 by specifying its record number.

The server 100 produces a document including a graph from the data described above. The following section will discuss a more specific procedure of producing a document.

Figure 9:
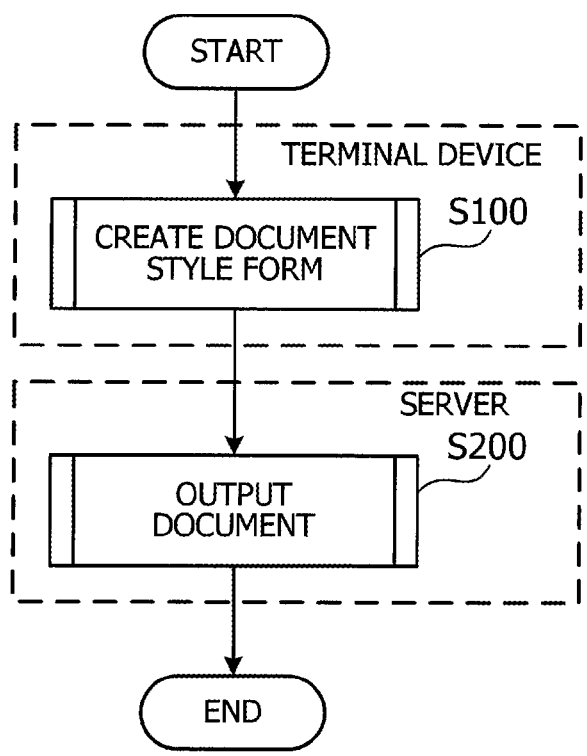
FIG. 9 is a flowchart illustrating a process of producing a document.

FIG. 9 is a flowchart illustrating a process of producing a document.

(Step S100) The terminal device 200 produces a document style form in accordance with user inputs. The terminal device 200 sends the resulting document style data to the server 100.

(Step S200) Using the received document style data, the server 100 produces and outputs a document. For example, the server 100 outputs the produced document to a printer 19.

Figure 10:
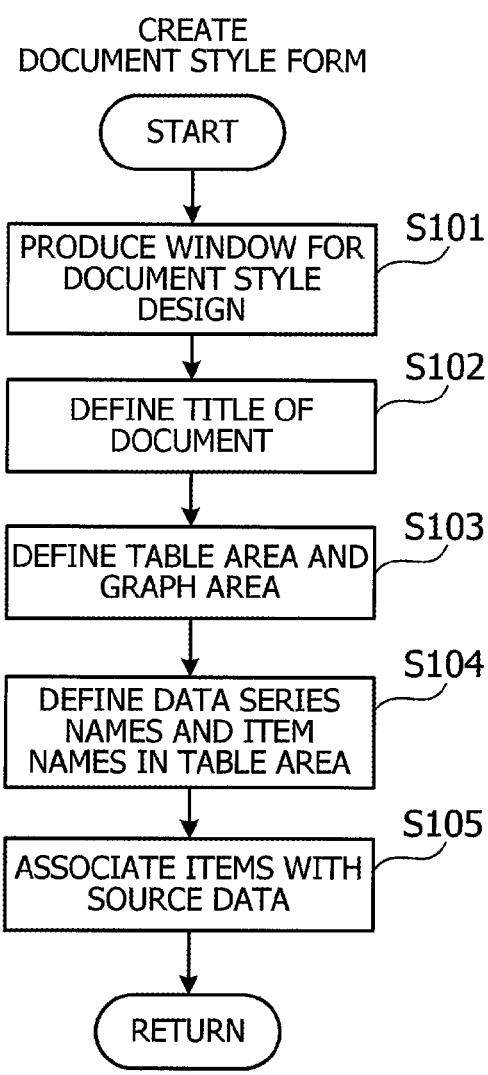
FIG. 10 is a flowchart illustrating how a document style form is created.

The above two steps will now be described in detail below. FIG. 10 is a flowchart illustrating how a document style form is created.

(Step S101) In response to an input from the user, the document style generation unit 220 in the terminal device 200 displays a window for document style design on a monitor screen, besides producing and storing an initial version of document style data in the document style storage unit 210.

(Step S102) The document style generation unit 220 produces a title of a document by interacting with the user. For example, the user may specify where to place a title in the document design window and what character string the title is. The document style generation unit 220 then places the specified character string at the specified position, thus producing a title string.

(Step S103) The document style generation unit 220 produces a table area and a graph area by interacting with the user. For example, the user may specify two points in the document design window and enters a command indicating that these points are part of a table area. In response, the document style generation unit 220 interprets the specified points as the top-left and bottom-right corners of a rectangle and selects that rectangular area as a table area of the document. The document style generation unit 220 thus places a table in the selected table area. Similarly, the user specifies another two points in the document design window and enters a command indicating that these points are part of a graph area. The document style generation unit 220 then interprets the specified points as the top-left and bottom-right corners of a graph area of the document.

(Step S104) The document style generation unit 220 produces column titles and item names for the table in the table area. For example, the user may enter character strings into the topmost row (header) of the table. The document style generation unit 220 then recognizes these character strings as column titles and thus incorporates them into the table definition. The user may also enter character strings in the leftmost column of the table. The document style generation unit 220 then recognizes these character strings as item names and thus incorporates them into the table definition.

(Step S105) The document style generation unit 220 further interacts with the user to determine how the cells of the table are associated with source data values. For example, the user may specify what number element of source data corresponds to which data series in the table. The document style generation unit 220 assigns a piece of information to each input field in the source data mapping section to indicate which part of the source data is associated with which part of the section. The document style generation unit 220 further furnishes the source data mapping section with attributes of the series data.

The terminal device 200 produces a document style form through the above steps. The resulting document style data is stored in its document style storage unit 210. The document style data is also transmitted from the terminal device 200 to the server 100 and stored in its document style storage unit 110. Based on this document style data in the document style storage unit 110, the server 100 generates and outputs a document.

Figure 11:
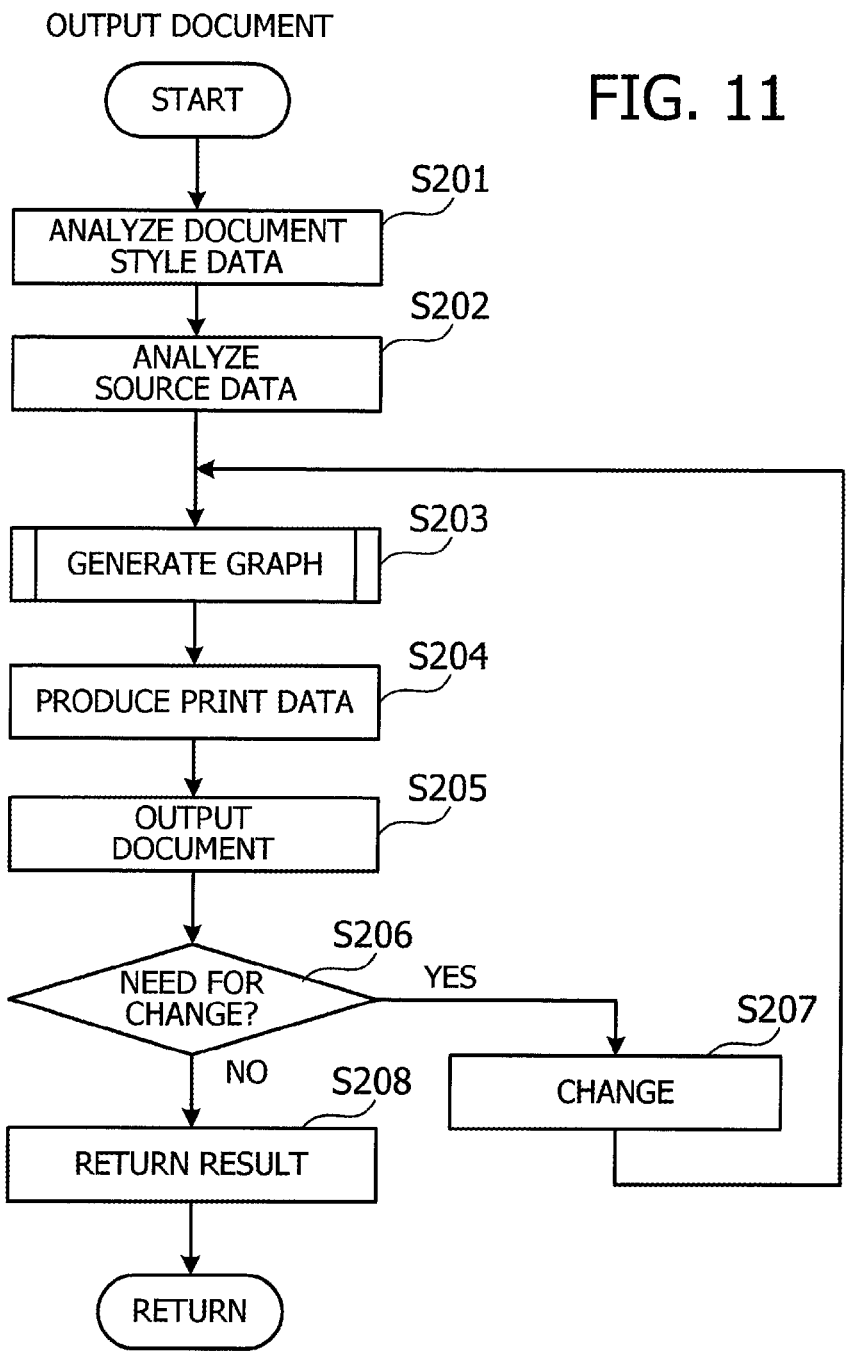
FIG. 11 is a flowchart illustrates how a document is output.

The next section will describe in detail how the server 100 outputs a document. FIG. 11 is a flowchart illustrates how a document is output. The illustrated process is executed when, for example, the user issues a document output command to the server 100, specifying which document style data and source data to use.

(Step S201) In response to a document output command from the user, the user application 162 instructs the analyzing unit 163 to output a document. For example, this instruction includes information that specifies which document style data and source data to use. Upon receipt of the output instruction, the analyzing unit 163 analyzes the specified document style data. For example, the analyzing unit 163 retrieves document style data from the document style storage unit 110 according to the received output instruction and analyzes what is specified in the retrieved document style data. The analyzing unit 163 then produces an initial version of document as defined in the document style data. This initial document data contains what is described in the retrieved document style data.

(Step S202) The analyzing unit 163 analyzes source data specified in the output instruction. For example, the analyzing unit 163 retrieves source data from the source data storage unit 120 according to the received output instruction and determines which part of the source data is associated with each specific data series defined in the table area of the document. The analyzing unit 163 then populates the table area with relevant part of the source data, thus making up a table for the document. The analyzing unit 163 supplies the graph generation unit 164 with the resulting document including this table.

(Step S203) The graph generation unit 164 generates a graph for the document. Details of this graph generation process will be described later with reference to FIG. 13.

(Step S204) The graph generation unit 164 produces data for printing out the document. For example, the graph generation unit 164 produces document data representing a printout image of the document including the generated graph.

(Step S205) The graph generation unit 164 transmits the produced document data to the printer 19, together with a print command therefor. The printer 19 outputs a printout of the document.

(Step S206) The analyzing unit 163 determines whether the document has to be changed. For example, the analyzing unit 163 recognizes the need for a change when a request for changing the document is received from the user through the user application 162. The analyzing unit 163, on the other hand, determines that there is no need for changing the document when the user acknowledges the satisfactory printout of the document. In the former case, the process proceeds to step S207. In the latter case, the process advances to step S208.

(Step S207) The analyzing unit 163 obtains a user-requested change via the user application 162 and applies the change to the document, except for its graph portion. For example, the analyzing unit 163 makes such changes as swapping the columns and rows of the table or altering the range of source data values. The process then goes back to step S203 to generate a new version of the graph based on the changed source data.

(Step S208) When no changes are requested, the user application 162 returns the result of its processing to the user. For example, the user application 162 displays a message on a terminal screen to inform the user that the document has been output. The user application 162 may also display in the same screen a piece of information indicating why the graph type has been selected for the document.

The above-described steps permit the server 100 to generate a document from given document style data and source data. The generation of a table and a graph is the main part of this process.

Figure 12:
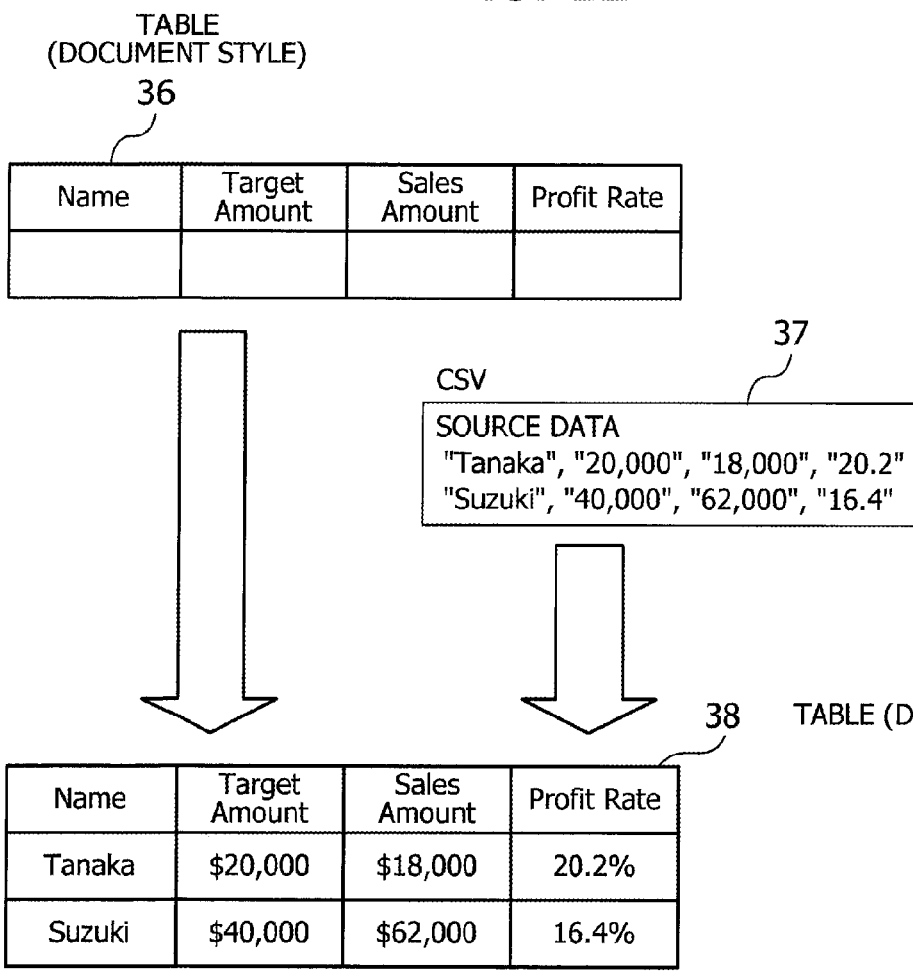
FIG. 12 illustrates an example how a table is produced for insertion to a document.

FIG. 12 illustrates an example how a table is produced for insertion to a document. The document style form 20 (FIG. 5) includes a table area to accommodate a table 36. Initially, each column of the table 36 is titled with a character string representing the name of a data series, but the table 36 contains no data values for those data series. The table 36 is then populated with source data 37. For example, the illustrated source data 37 is in the CSV format. That is, each record in this source data 37 is made up of a plurality of data values separated by commas (together with quotation marks, where appropriate). Specifically, each record contains the following five data values in the following order: "Name," "Target Amount," "Sales Amount," and "Profit Rate." These data values are entered to their corresponding data series in the table 36. FIG. 12 illustrates a table 38 produced in this way.

Figure 13:
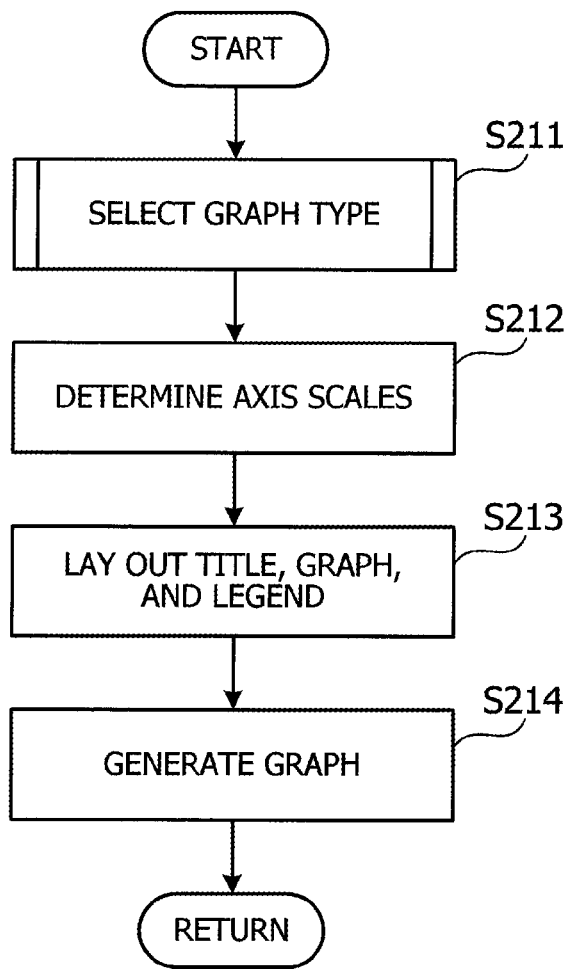
FIG. 13 is a flowchart illustrating how a graph is generated.

The next section will describe in detail how the server 100 generates such a graph. FIG. 13 is a flowchart illustrating a graph generation process.

(Step S211) The graph generation unit 164 selects which type of graph to generate for the document. Details of this graph type selection will be described later with reference to FIG. 14.

(Step S212) The graph generation unit 164 determines axis scales of the graph to be generated. In other words, it determines in what units each axis of the graph is scaled. For example, the graph generation unit 164 finds the maximum of data values in the graph and selects an appropriate scale in such a way that the maximum value can be plotted within the given graph area 24.

(Step S213) The graph generation unit 164 lays out the graph title, graph, and legend in the graph area 24.

(Step S214) The graph generation unit 164 generates a graph. For example, the graph generation unit 164 generates a graph of the graph type selected at step S211 and places the generated graph in the graph area 24.

A graph is generated in the way described above. The next section provides details of the aforementioned step of selecting an appropriate graph type.

Figure 14:
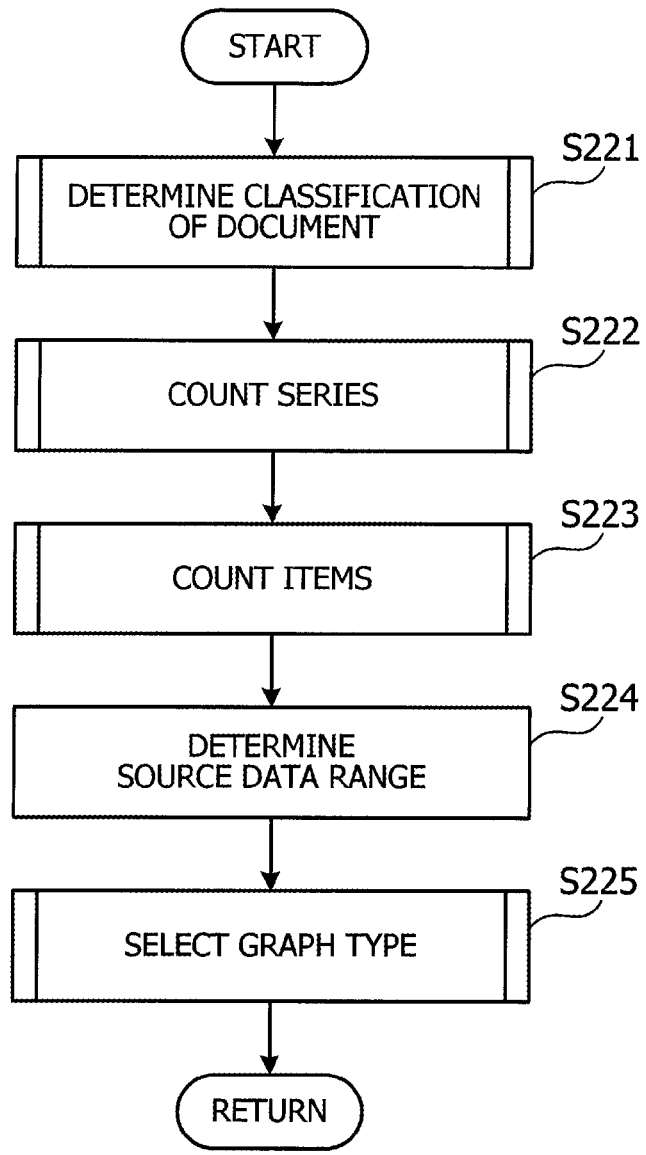
FIG. 14 is a flowchart illustrating how a graph type is determined.

FIG. 14 is a flowchart illustrating a graph type determination process.

(Step S221) The graph generation unit 164 determines the classification of a document by examining its title. Specifically, the document is classified as either "comparison" or "analysis" depending on the title. The result of this classification processing is recorded in flag data 143 (see FIG. 8). Details of the title-based classification of documents will be described later with reference to FIG. 15.

(Step S222) The graph generation unit 164 determines how many data series will be included in the graph by examining the header section of its table area. Details of this determination process will be described later with reference to FIG. 19.

(Step S223) The graph generation unit 164 determines how many items will be included in the graph by examining source data. Details of this determination process will be described later with reference to FIG. 20.

(Step S224) The graph generation unit 164 determines what range of source data values will be plotted in the graph. For example, the graph generation unit 164 excludes some of the source data values from the graph when they are smaller than or equal to a specified threshold. For example, a set of source data may be omitted when all of their values are zeros. The threshold for the source data range may be specified by the user.

(Step S225) The graph generation unit 164 determines which type of graph to select, according to the result of title-based classification, the number of data series, and the number of items. Details of this determination process will be described later with reference to FIG. 21.

The server 100 determines the type of graph in the way described above. The next section will provide the details of title-based classification of documents.

Figure 15:
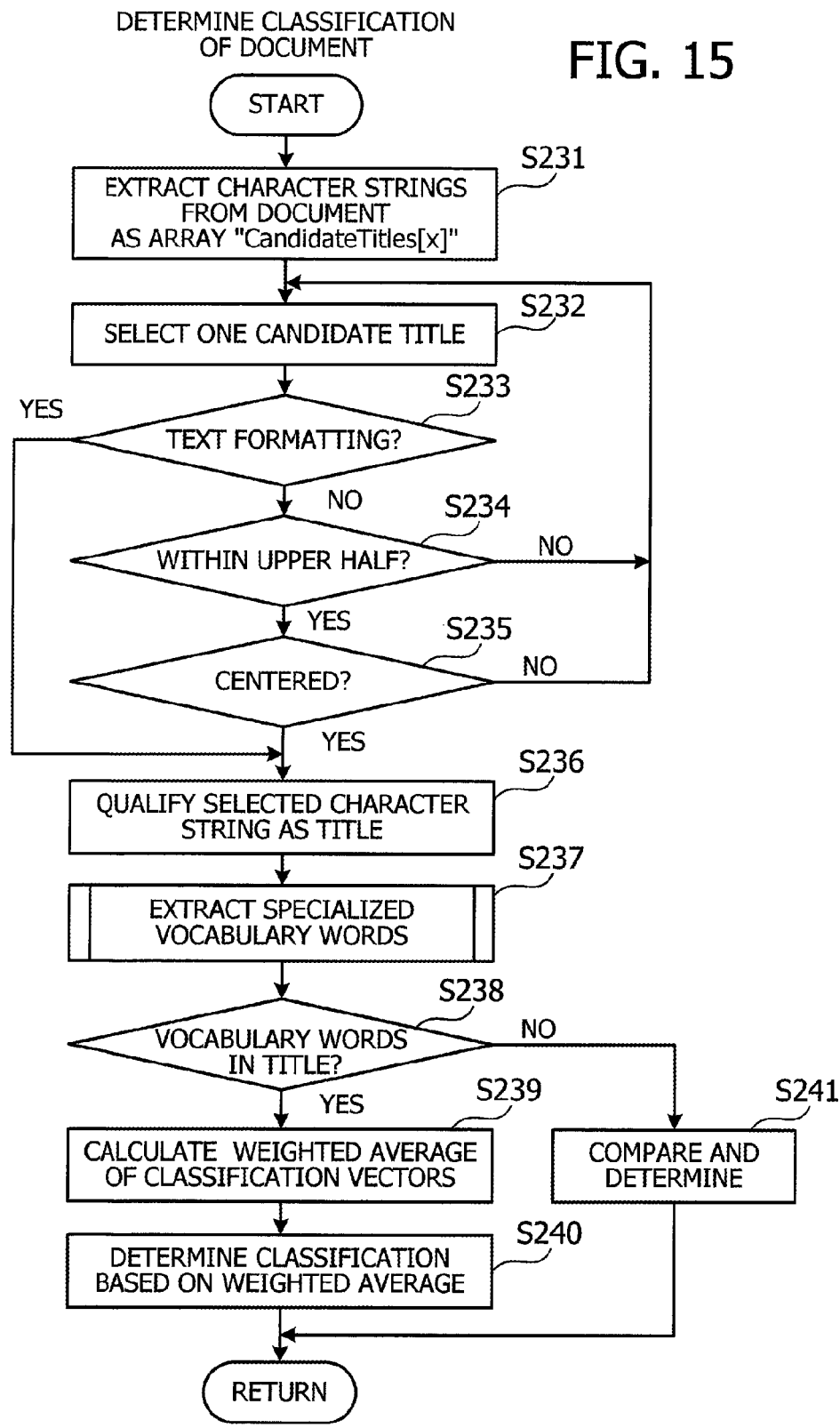
FIG. 15 is a flowchart illustrating how the classification of a document is determined.

FIG. 15 is a flowchart illustrating a process of determining classification of a document.

(Step S231) The graph generation unit 164 extracts character strings (text data) from the document in question. The graph generation unit 164 produces an array named "CandidateTitles" (expressed as CandidateTitles[x]) containing the extracted character strings as its constituent elements. This array is stored as candidate title data 141 in the intermediate data storage unit 140.

(Step S232) The graph generation unit 164 selects one candidate title. For example, array CandidateTitles[x] is indexed by an integer variable. The graph generation unit 164 selects candidate titles one by one, increasing the variable in ascending order. Each time a new candidate title is extracted, the process moves to step S233.

(Step S233) The graph generation unit 164 determines whether the selected candidate title has any text formatting that modifies its appearance. This determination is made by, for example, consulting text formatting parameters included as part of item parameters in the document data. When particular text formatting is found, the process skips to step S236. When no text formatting is found, the process advances to step S234.

(Step S234) The graph generation unit 164 determines whether the selected candidate title is located in the upper half of the document. For example, the graph generation unit 164 obtains the vertical size (height) of the document by consulting the item size parameter in the section of partition parameters for the entire document, which are registered as part of the document data. The graph generation unit 164 then checks the item position parameter of the selected candidate title to determine whether its position is within the upper half of the document. When the position is found to be within the upper half of the document, the process advances to step S235. When the position is found to be within the lower half of the document, the process goes back to step S232 to select another candidate title.

(Step S235) The graph generation unit 164 determines whether the selected candidate title is located at the horizontal center of the document. For example, the graph generation unit 164 obtains the horizontal size (width) of the document by consulting the item size parameter in the section of partition parameters for the entire document, which are registered as part of the document data. The graph generation unit 164 then checks the item position parameter and item size parameter of the selected candidate title to determine whether the candidate title is across a vertical line that divides the whole document into left and right halves. The graph generation unit 164 may also be configured to determine that the candidate titles is at the horizontal center when its alignment parameter is set to "centered." When the selected candidate titles sits at the horizontal center of the document, the process advances to step S236. Otherwise, the process goes back to step S232 to select another candidate title.

(Step S236) The graph generation unit 164 qualifies the currently selected candidate title as the document's title.

(Step S237) The graph generation unit 164 extracts specialized vocabulary words from the character string of the title. Details of this vocabulary extraction will be described later with reference to FIG. 17.

(Step S238) The graph generation unit 164 determines whether it has extracted at least one specialized vocabulary word from the title. When one or more specialized vocabulary words have been extracted, the process advances to step S239. When no specialized vocabulary words are found, the process proceeds to step S241.

(Step S239) When specialized vocabulary words are found in the title, the graph generation unit 164 then calculates a weighted average of their classification vectors. For example, the classification vector of a specialized vocabulary word is given a greater weight to when the specialized vocabulary word's location is closer to the first word of the title. The graph generation unit 164 then calculates an average of the classification vectors, taking their respective weights into consideration.

(Step S240) Based on the weighted average of classification vectors calculated above, the graph generation unit 164 determines the classification of the document. For example, the graph generation unit 164 compares the two components (i.e., "comparison" and "analysis" values) of the averaged classification vector and figures out which of the two is greater. If the comparison value is greater than the analysis value, the graph generation unit 164 concludes that the document falls in the "comparison" group. If the analysis value is greater than the comparison value, the graph generation unit 164 concludes that the document falls in the "analysis" group. The graph generation unit 164 then exits from the process of document classification.

(Step S241) When the title contains no specialized vocabulary words, the graph generation unit 164 determines that the document falls in the "comparison" group. The graph generation unit 164 then exits from the process of document classification.

Figure 16:
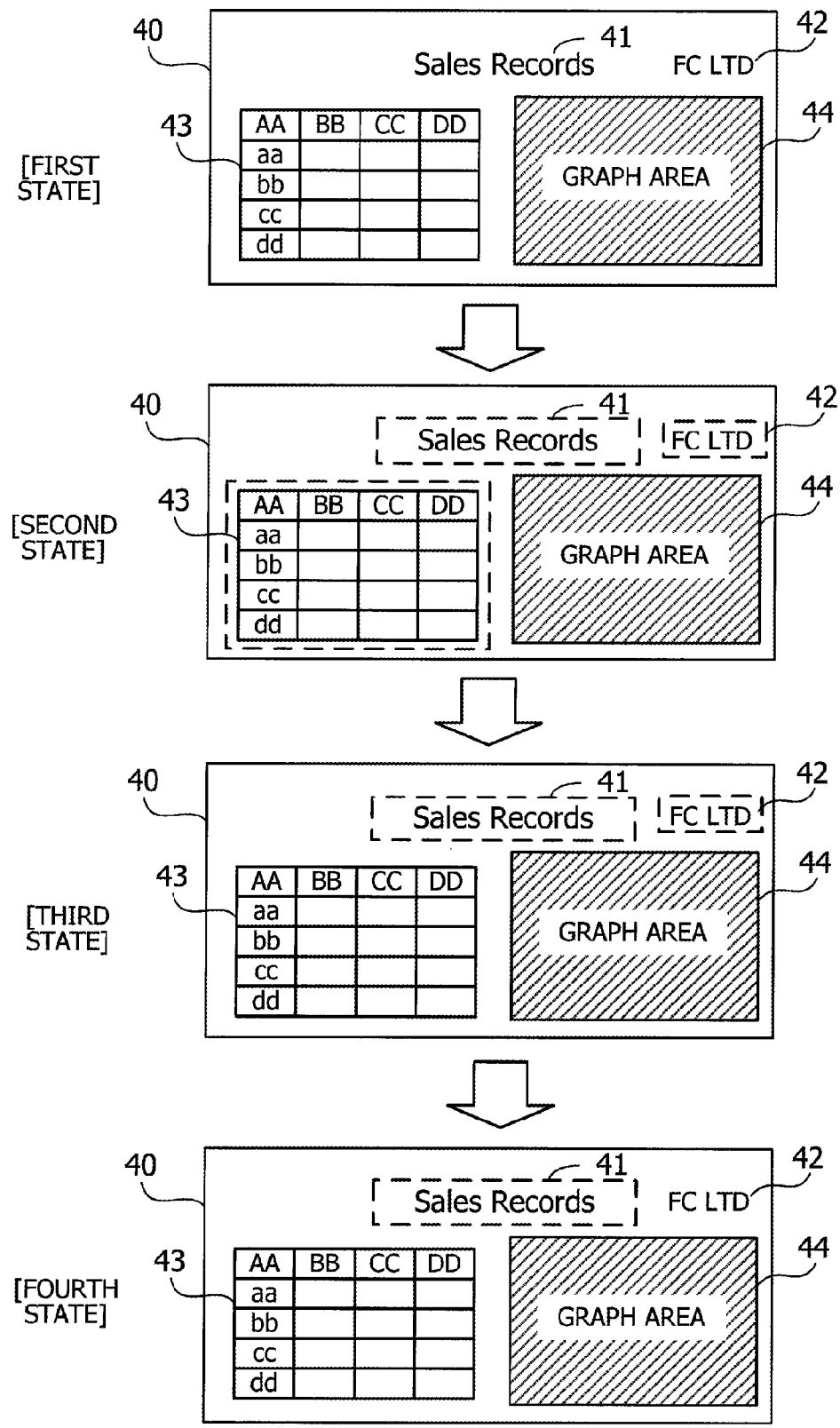
FIG. 16 illustrates an example of title extraction from a document.

The above-described steps permit the server 100 to extract a title of a document and specify the purpose of the document based on the extracted title. FIG. 16 illustrates an example of title extraction from a document, which includes four distinct states of a document 40. The first state represents the document 40 before a graph is generated. Specifically, the document 40 contains its title 41, author name 42, table 43, and graph area 44. The title 41 is contained in the document data as a simple character string, with no particular distinctions from other character strings in the document.

For this reason, the graph generation unit 164 analyzes the document 40 to find which character string is its title.

The title extraction process begins with extraction of character strings from the document 40. The second state of the document 40 in FIG. 16 represents the result of this character string extraction. Referring to the example of FIG. 16, character strings have been extracted from the title 41, author name 42, and table 43. These character strings are stored as a set of candidate titles.

The title extraction process then extracts modified character strings from the candidate titles. In the example of FIG. 16, however, none of those candidate titles is modified. Accordingly, each candidate title is subjected to determination of whether it is located in the upper half of the document 40. The third state seen in FIG. 16 represents the result of this determination. That is, the title 41 and author name 42 are both in the upper half, whereas most part of the table 43 belongs to the lower half of the document 40.

The title extraction process further examines each candidate title in the upper half to determine whether it is located at the horizontal center of the document. The fourth state seen in FIG. 16 represents the result of this determination. Referring to the example of FIG. 16, the title 41 is the only character string that sits at the center of the document 40. Accordingly, the title extraction process successfully singles out the title 41 from among the plurality of candidates.

While the server 100 in the above example relies on the layout of character strings to extract a title, the embodiment is not limited by that specific example. Another possible method is to locate the word "Title" and then extract the immediately subsequent character string as the title. Yet another possible method is to extract a character string whose attribute or property indicates its status as a title.

The server 100 then searches the extracted title to find specialized vocabulary words. FIG. 17 is a flowchart illustrating an example of a vocabulary extraction process.

(Step S251) The graph generation unit 164 assigns an initial value of one to a variable y, which is an integer greater than zero. This variable y is a local variable whose scope is only within the present process of vocabulary extraction.

(Step S252) The graph generation unit 164 retrieves the y-th specialized vocabulary word from the vocabulary storage unit 130. For example, the specialized vocabulary words are stored as an array named "Vocabulary." The graph generation unit 164 refers to the y-th element of this array by specifying y as the index.

(Step S253) The graph generation unit 164 determines whether or not the title contains a character string of any of the retrieved specialized vocabulary word and its quasi-synonyms. When the title contains such a character string, the process advances to step S254. Otherwise, the process skips to step S255.

(Step S254) Since it is found that the title contains the retrieved specialized vocabulary word, the graph generation unit 164 assigns the specialized vocabulary word's data (i.e., its character string and classification vector) to an array named "Vectors." The process then advances to step S255.

(Step S255) The graph generation unit 164 determines whether the variable y has reached $y_{max}$. The value $y_{max}$ is an integer greater than zero, representing the total number of specialized vocabulary words registered in the vocabulary storage unit 130. When $y \geq y_{max}$, the graph generation unit 164 exits from the present process of vocabulary extraction. When $y < y_{max}$, the process advances to step S256.

(Step S256) The graph generation unit 164 increments the variable y by one and goes back to step S252.

The above steps permit the server 100 to extract specialized vocabulary words from a given title and obtain an array Vectors[ ] containing their respective classification vectors. When no specialized vocabulary words are found in the title, the server 100 classifies the document as falling in the "comparison" group. When some specialized vocabulary words are extracted from the title, the server 100 determines the classification of the document based on the position of each specialized vocabulary word within the title, as well as on the classification vector of each specialized vocabulary word, as will be described below.

FIG. 18 illustrates an example of title-based classification of documents. The example of FIG. 18 assumes that the document in question is titled "Population Structure Trend," and that the vocabulary storage unit 130 (see FIG. 7) contains "structure" and "trend" as part of its entries. The server 100 thus extracts two specialized vocabulary words "structure" and "trend" from the title "Population Structure Trend" in this case.

The former specialized vocabulary word "structure" has been assigned a classification vector of (0, 1), while the latter specialized vocabulary word "trend" a different classification vector (1, 0). The left component of a classification vector represents the degree of "comparison," and the right component represents the degree of "analysis." Without weighting, the sum of these two classification vectors would have equal component values, meaning that the title falls into "comparison" and "analysis" groups at equal confidence. To avoid this situation, the second embodiment uses a weighting process to evaluate specialized vocabulary words in the title. Even though the server 100 has extracted equal numbers of "comparison" and "analysis" specialized vocabulary words in FIG. 18, the weighting process makes it possible to classify the title more properly.

Specifically, the second embodiment defines a weighted classification vector Vi as follows.

$$V_i = v \times [N \times \log \{N/(N-i)\} + 1] \quad (1)$$

where v is the original classification vector of a specialized vocabulary word, N is an integer greater than zero which represents the number of specialized vocabulary words extracted from the title, and i is a positive integer smaller than N which represents the position of a specialized vocabulary word within the title. The position of a specialized vocabulary word takes a value of zero when the specialized vocabulary word is located closest to the first word of the title. In other words, the first-appearing specialized vocabulary word in the title has a position value of zero. Then the second closest specialized vocabulary word will have a position value of one, while the farthest specialized vocabulary word (or the one closest to the last word of the title) will have a position value of N−1. In the above formula (I), the symbol "log" denotes the common logarithm with base 10.

The classification vectors of extracted specialized vocabulary words are subjected to formula (I) for the purpose of weighting, and their arithmetic average (referred to herein as "Score") is calculated as follows.

$$\text{Score} = (\Sigma V_i)/N \quad (2)$$

Referring to the example of FIG. 18, "structure" is the specialized vocabulary word that appears in the first place in the title and is thus given a position value of zero. The above weighting operation is applied to the classification vector of this specialized vocabulary word "structure" as follows:

$$(0,1) \times [2 \times \log(2/2-0)+1] = (0,1) \times 1$$

The second specialized vocabulary word in the title is "trend" with a position value of one. The classification vector of this specialized vocabulary word "trend" is then weighted as follows:

$$(1,0) \times [2 \times \log(2/2-1)+1] = (1,0) \times 1.6$$

The average of these two weighted vectors will be:

$$\text{Score} = ((0,1) \times 1 + (1,0) \times 1.6)/2 = (0.8, 0.5)$$

Note that the comparison component "0.8" overweighs the analysis component "0.5" in the resulting Score vector. Accordingly the document titled "Population Structure Trend" falls in the "comparison" group.

While the title in the example of FIG. 18 includes only two specialized vocabulary words, the above-described calculation similarly applies to other cases in which three or more specialized vocabulary words are included in the title. Suppose, for example, that the title contains three specialized vocabulary words, the first one with a classification vector (0, 1), the second one with (1, 0), and the third one with (1, 0). In this example, the following calculation is performed:

$$V_0 = (0,1) \times [3 \times \log\{3/(3-0)\}+1]$$

$$V_1 = (1,0) \times [3 \times \log\{3/(3-1)\}+1]$$

$$V_2 = (1,0) \times [3 \times \log\{3/(3-2)\}+1]$$

$$\text{Score} = \{(0,1) \times 1 + (1,0) \times 1.52 + (1,0) \times 2.43\}/2 = (1.31, 0.3)$$

The result indicates that the comparison component "1.31" overweighs the analysis component "0.3" in the Score vector. Accordingly the document falls in the "comparison" group.

As can be seen from the above examples, the weighting process of formula (I) places more emphasis on the specialized vocabulary words that appear in later part of the title. This weighting policy follows certain linguistic characteristics of the language that is used in the document. In the present example, the modifying phrase "Population Structure" precedes the modified word "Trend," and the modified word is given a heavier weight than the modifying phrase to make the title classification more appropriate. The person skilled in the art would appreciate that the above-described weighting in formula (I) is only an example, and that there are other possible methods for the weighting of classification vectors.

The second embodiment determines which type of graph to select based on the above-described classification of documents. As will be described below, the selection process may also rely on the number of data series and the number of items. The following section will first discuss how the number of data series is determined.

FIG. 19 is a flowchart illustrating how the number of data series is determined.

(Step S261) The table header includes character strings of column titles. The graph generation unit 164 refers to those title strings as candidates for the data series. For example, the graph generation unit 164 selects each such character string in the header section and assigns it to an array named "Candidates."

(Step S262) The graph generation unit 164 assigns an initial value of one to a variable x, which is an integer greater than zero. This variable x is a local variable whose scope is only within the present process of counting the number of data series.

(Step S263) The graph generation unit 164 assigns an initial value of one to another variable y, which is an integer greater than zero. This variable y is a local variable whose scope is only within the present process of counting the number of data series.

(Step S264) The graph generation unit 164 retrieves the y-th specialized vocabulary word (Vocabulary[y]) from the vocabulary storage unit 130.

(Step S265) The graph generation unit 164 determines whether or not the x-th candidate (Candidates[x]) contains a character string of any of the retrieved specialized vocabulary word and its quasi-synonyms. For example, the graph generation unit 164 searches the character string of the x-th candidate for a character string of the retrieved y-th specialized vocabulary word or its quasi-synonyms. When such a character string is found, the graph generation unit 164 recognizes the presence of a specialized vocabulary word and thus proceeds to step S268. When neither the specialized vocabulary word nor quasi-synonym is found, the process advances to step S266.

(Step S266) When the x-th candidate does not contain the retrieved y-th specialized vocabulary word, the graph generation unit 164 determines whether the variable y has reached $y_{max}$, i.e., the number of specialized vocabulary words. When $y_{max}$ has been reached, the process proceeds to step S271. When y is smaller than $y_{max}$, the process advances to step S267.

(Step S267) The graph generation unit 164 increments the variable y by one and goes back to step S264.

(Step S268) Since the x-th candidate contains the retrieved y-th specialized vocabulary word, the graph generation unit 164 checks the classification of that specialized vocabulary word. When the specialized vocabulary word in question is classified as "comparison," the process advances to step S269. When the specialized vocabulary word is classified as "analysis," the process advances to step S270. When no particular classification is assigned to the specialized vocabulary word (e.g., as in "volume" and "total" in FIG. 7), the process advances to step S272.

(Step S269) When the specialized vocabulary word in question is classified as "comparison," the graph generation unit 164 further checks the flag to see whether the title-based classification of the document is "comparison." When the flag also indicates "comparison," the process advances to step S271. When the flag indicates "analysis," the process skips to step S272.

(Step S270) When the specialized vocabulary word in question is classified as "analysis," the graph generation unit 164 further checks the flag to see whether the title-based classification of the document is "analysis." When the document is classified as "analysis," the process advances to step S271. When the document is classified as "comparison," the process skips to step S272.

(Step S271) This step S271 is reached because the retrieved specialized vocabulary word matches with the document in terms of their classifications, or no specialized vocabulary words are found in the x-th candidate. Accordingly, the graph generation unit 164 qualifies the x-th candidate as a data series. For example, the graph generation unit 164 enters the character string of the x-th candidate to an array named "DataSeries."

(Step S272) The graph generation unit 164 determines whether the variable x has reached $x_{max}$, i.e., the number of candidates. When $x_{max}$ has been reached, the process advances to step S274. When x is smaller than $x_{max}$, the process advances to step S273.

(Step S273) The graph generation unit 164 increments the variable x by one and goes back to step S263.

(Step S274) The graph generation unit 164 counts the number of elements that have been qualified as data series. For example, the graph generation unit 164 counts the number of character strings registered in the array "Series."

(Step S275) The graph generation unit 164 determines to use the resulting count of step S274 as the number of data series in the graph.

The above steps permit the server 100 to find which column titles in the table header have the same classification of specialized vocabulary words as the whole document. These column titles designate the data series when generating a graph. The server 100 then counts how many such data series are present. In the above example of FIG. 19, candidates with no specialized vocabulary words are also qualified as data series. The second embodiment may, however, be modified to reject such candidates from the data series.

FIG. 20 illustrates an example of counting data series. The document in this example is classified as "comparison." The header section of the illustrated table 33 contains the following four column titles: "Name," "Target Amount," "Sales Amount," and "Profit Rate." Referring to the vocabulary storage unit 130 in FIG. 7, the word "rate" is registered as a quasi-synonym of specialized vocabulary word "ratio." Note that this word "rate" is included in the rightmost column title "Profit Rate" in FIG. 20. The classification of "rate" is "analysis" as seen in FIG. 7, meaning that the vocabulary-based classification of column title "Profit Rate" does not match with the classification of the document. Due to this mismatch, the column title "Profit Rate" is not qualified as a data series.

The remaining column titles "Name," "Target Amount," and "Sales Amount" are each qualified as a data series since they do not contain any specialized vocabulary words or quasi-synonyms of specialized vocabulary words. Accordingly, three data series are found in the table 33, i.e., the number of data series=3. It is noted that the second embodiment is configured to count the column "Name" as one of the data series since this column will be referenced when counting items.

Figure 21:
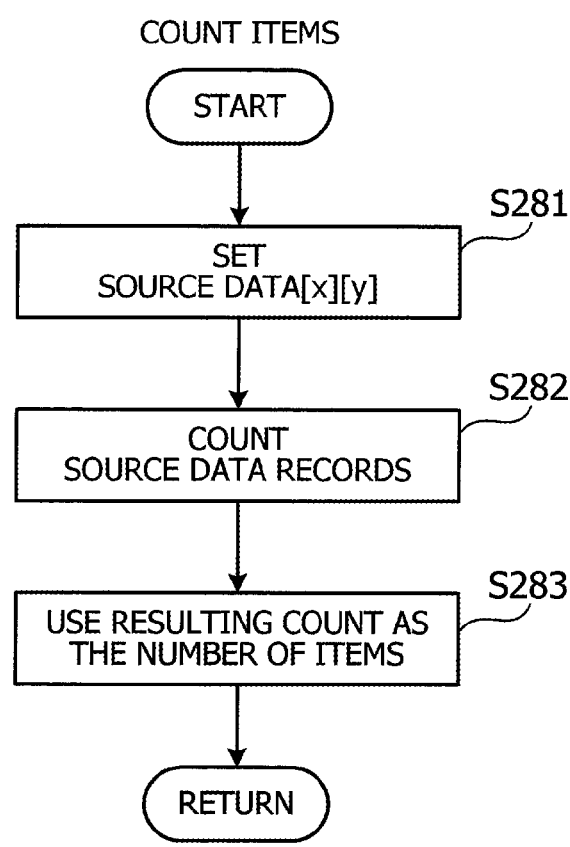
FIG. 21 is a flowchart illustrating an example of how the number of items is determined.

The aforementioned process of counting items will now be described in detail below. FIG. 21 is a flowchart illustrating an example of how the number of items is determined.

(Step S281) The graph generation unit 164 reads source data values out of the source data storage unit 120 for use in a document generation process. Specifically, these data values are assigned to a two-dimensional array named "SourceData" (referred to as SourceData[x][y]). Each record of the source data is serial numbered, so that a particular record can be obtained by specifying its serial number in a variable x. Each data value within a record is serial numbered, so that a particular data value can be obtained by specifying its serial number in another variable y.

(Step S282) The graph generation unit 164 counts the number of records x in the above array SourceData[x][y].

(Step S283) The graph generation unit 164 determines to use the resulting count as the number of items in the graph.

The above steps permit the server 100 to determine the number of items. Now that the document classification, the number of data series, and the number of items have been determined, the server 100 selects an appropriate graph type by using these pieces of information.

Figure 22:
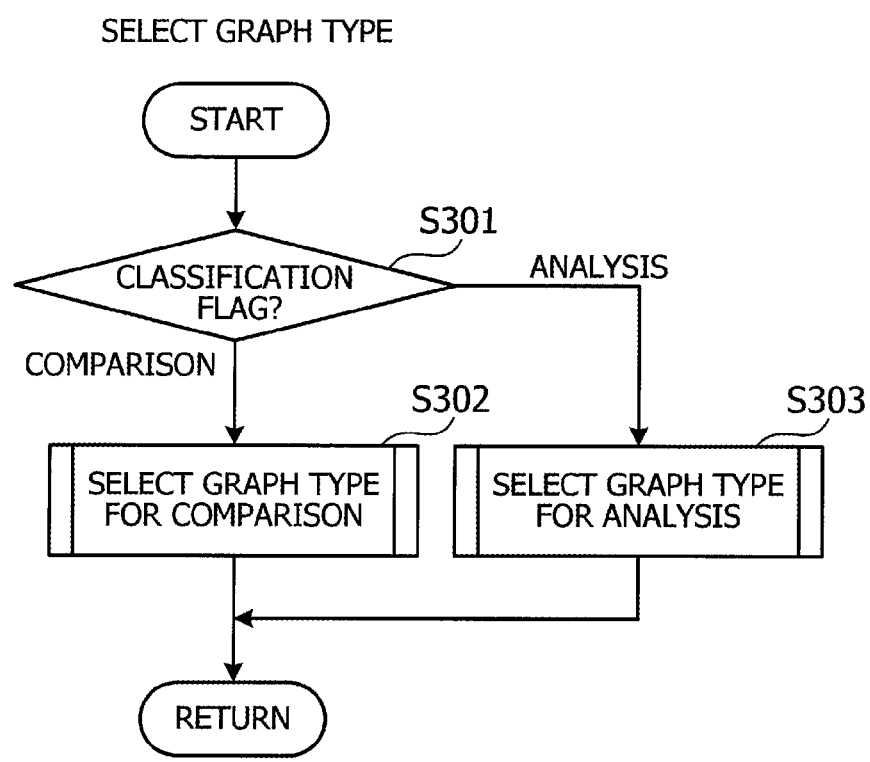
FIG. 22 is a flowchart illustrating how a graph type is selected.

FIG. 22 is a flowchart illustrating how a graph type is selected.

(Step S301) The graph generation unit 164 determines whether the classification flag of the document indicates "comparison" or "analysis." When it is "comparison," the process advances to step S302. When it is "analysis," the process advances to step S303.

(Step S302) Since the document is for comparison purposes, the graph generation unit 164 executes a process of selecting a graph type suitable for data comparison. Details of this graph type selection process will be described later with reference to FIG. 23.

(Step S303) Since the document is for analysis purposes, the graph generation unit 164 executes a process of selecting a graph type suitable for data analysis. Details of this graph type selection process will be described later with reference to FIG. 24.

Figure 23:
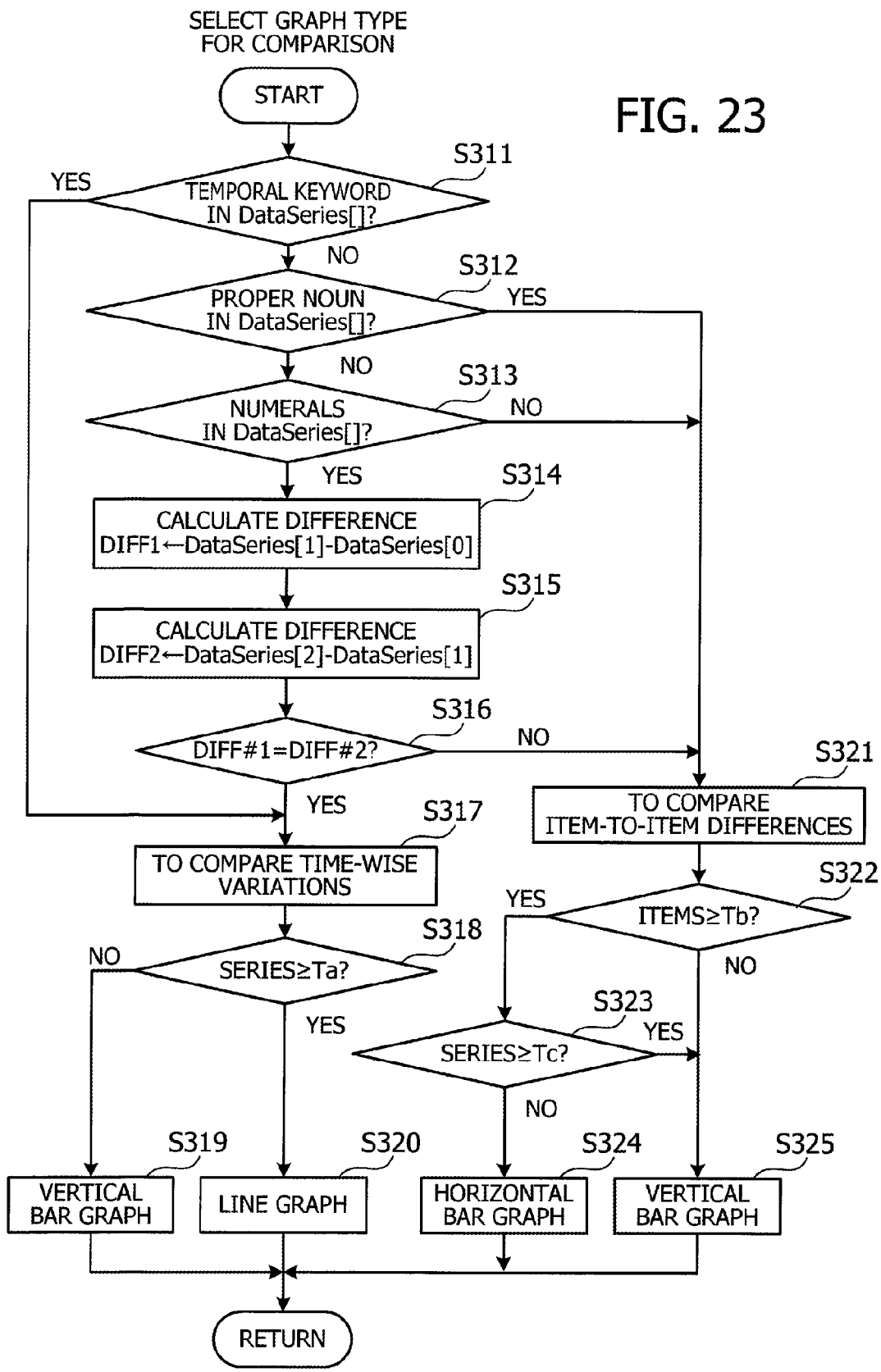
FIG. 23 is a flowchart illustrating a process of selecting a graph type for comparison.

The aforementioned graph type selection process for comparison will now be described in detail below. FIG. 23 is a flowchart illustrating a process of selecting a graph type for comparison.

(Step S311) The graph generation unit 164 determines whether the series data 145 (see FIG. 8) contains any temporal keywords. Temporal keywords are the terms implying a certain concept about period or time, such as "first half of the fiscal year," "morning," and "spring." For example, the graph generation unit 164 retrieves every character string registered in array DataSeries[ ] and examines the presence of temporal keywords. When a temporal keyword is found, the process skips to step S317. When no temporal keywords are found, the process advances to step S312.

(Step S312) The graph generation unit 164 determines whether the series data 145 contains any proper nouns, such as the name of a person or company. For example, the graph generation unit 164 retrieves every character string registered in array DataSeries[ ] and examines the presence of proper nouns. If a proper noun is found, the process proceeds to step S321. If no proper nouns are found, the process advances to step S313.

(Step S313) The graph generation unit 164 determines whether the series data 145 contains any numerals, For example, the graph generation unit 164 retrieves every character string registered in array DataSeries[ ] and examines the presence of numerals. If some numerals are found, the process advances to step S314. If no numerals are found, the process proceeds to step S321.

(Step S314) The graph generation unit 164 calculates a difference (DIFF#1) of numerical values between the first data series and the second data series.

(Step S315) The graph generation unit 164 calculates a difference (DIFF#2) of numerical values between the second data series and the third data series.

(Step S316) The graph generation unit 164 compares the first difference DIFF#1 of step S314 with the second difference DIFF#2 of step S315. When the two differences are equal to each other, the process advances to step S317. When the two differences are not equal, the process branches to step S321.

(Step S317) The graph generation unit 164 determines that the graph is to compare time-wise variations.

(Step S318) The graph generation unit 164 compares the number of data series contained in the series data 145 with a predetermined threshold Ta, where Ta is a positive integer. When the number of data series is greater than or equal to Ta, the process advances to step S320. When the number of data series is smaller than Ta, the process advances to step S319.

(Step S319) Since the number of data series is smaller than Ta, the graph generation unit 164 selects vertical bar graphs as the graph type to use. The graph generation unit 164 then exits from this graph selection process for comparison.

(Step S320) Since the number of data series is greater than or equal to Ta, the graph generation unit 164 selects line graphs as the graph type to use and then exits from this graph selection process for comparison.

(Step S321) The graph generation unit 164 determines that the graph is to compare item-to-item differences.

(Step S322) The graph generation unit 164 compares the number of data series with another predetermined threshold Tb, where Tb is a positive integer. When the number of data series is greater than or equal to Tb, the process advances to step S323. When the number of data series is smaller than Tb, the process advances to step S325.

(Step S323) The graph generation unit 164 compares the number of data series with yet another predetermined threshold Tc, where Tc is a positive integer. When the number of data series is greater than or equal to Tc, the process advances to step S325. When the number of data series is smaller than Tc, the process advances to step S324.

(Step S324) When the number of data series is smaller than Tc, the graph generation unit 164 selects horizontal bar graphs as the graph type to use and then exits from this graph selection process for comparison.

(Step S325) Since the number of items is smaller than Tb, or since the number of data series is greater than or equal to Tc, the graph generation unit 164 selects vertical bar graphs as the graph type to use and then exits from this graph selection process for comparison.

The above steps permit the server 100 to select a graph type suitable for a document classified in the comparison group. The thresholds Ta, Tb, and Tc may be specified by the user. For example, the thresholds Ta, Tb, and Tc may be set to five. When, on the other hand, the document is classified in the analysis group, the server 100 determines which graph to select in the way described in detail below.

Figure 24:
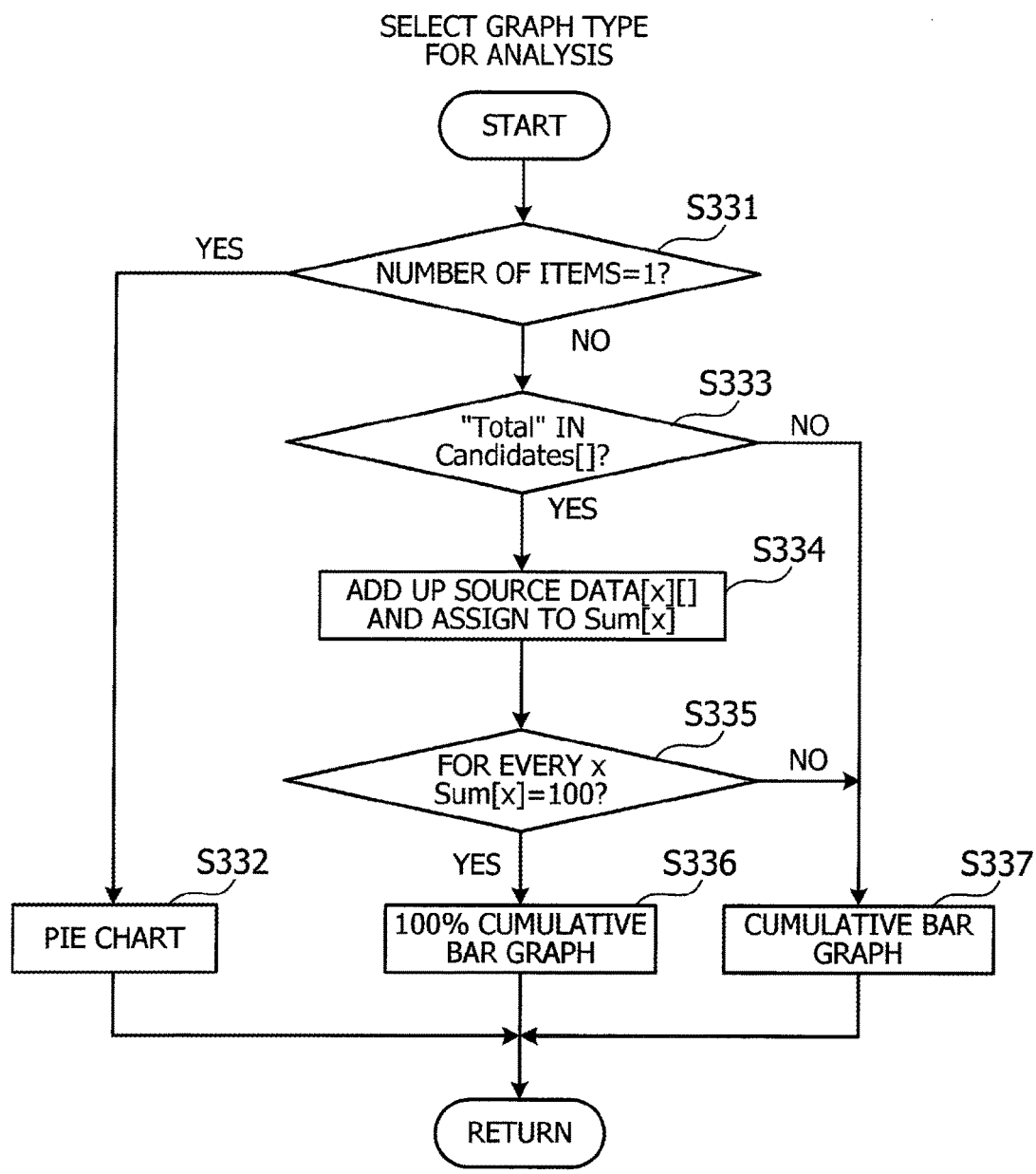
FIG. 24 is a flowchart illustrating an example of how a graph type for analysis is selected.

FIG. 24 is a flowchart illustrating an example of how a graph type for analysis is selected.

(Step S331) The graph generation unit 164 determines whether the number of items is one. When the number of items is found to be one, the process proceeds to step S332. When the number of items is more than one, the process advances to step S333.

(Step S332) Since there is only one item, the graph generation unit 164 selects pie graphs as the graph type to use and then exits from this graph selection process for analysis.

(Step S333) The graph generation unit 164 searches candidate series data 144 stored in the intermediate data storage unit 140 to see whether any of the registered candidates for the data series contains a character string of "total." When "total" is found, the process advances to step S334. When "total" is not found, the process proceeds to step S337.

(Step S334) The graph generation unit 164 adds up data values in each individual record of the source data 146 and compiles sum data 147 from the resulting sums of those records. For example, the graph generation unit 164 repeats the following operations while incrementing a local variable x (integer greater than zero), whose scope is limited in this graph selection process for analysis. Specifically, the graph generation unit 164 extracts all data elements from the two-dimensional array SourceData[ ][ ], with the variable x used as the first index of the array. What are extracted are numerical values in the x-th record. The graph generation unit 164 adds up such numerical values, thus assigning the calculated total value to array Sum[x].

(Step S335) The graph generation unit 164 examines the resulting array Sum[x] as to whether the total value is 100 throughout the range of x. When Sum[x] is 100 for every x, the process advances to step S336. When Sum[x] is not 100 for at least one value of x, the process advances to step S337.

(Step S336) Since Sum[x] is 100 for every x, the graph generation unit 164 selects 100% cumulative bar graphs as the graph type to use and then exits from this graph selection process for analysis.

(Step S337) This step is reached because "total" is not included in the candidates, or because Sum[x] is not 100 for at least one value of x even if "total" is included in the candidates. In these cases, the graph generation unit 164 selects cumulative bar graphs as the graph type to use and then exits from this graph selection process for analysis.

The above steps permit the server 100 to select a graph type suitable for a document classified in the analysis group. As seen from FIG. 24, the graph type for analysis is determined from the sum of data values in each record of source data. Note that 100% cumulative bar graphs are suitable for presentation of data in percentage.

FIG. 25 illustrates an example of how to select a graph type based on the sum of data values. Specifically, the upper half of FIG. 25 depicts a first example of sum-based graph selection, and the lower half a second example of the same.

The table seen in the first example summarizes evaluation results of some objects or activities in each quarter of a specific year. The results are rated as "Good" or "Fair" or "Bad." In the first example, the sum of the three corresponding figures in each quarter is fixed at 100. This suggests that the evaluation results are expressed in percentage. Accordingly, the graph generation unit 164 chooses 100% cumulative bar graphs.

The second example similarly summarizes evaluation results of some objects or activities in each quarter with the grade of "Good" or "Fair" or "Bad." The difference is that the sum of the per-quarter figures is not always 100 in the second example. This fact suggests that the evaluation results are expressed not in percentage, but in other ways such as in the number of graders who evaluated those things. In this case, cumulative bar graphs will be the choice.

As can be seen from the above examples, the server 100 selects a graph type suitable for the content of the graph to generated, depending on whether the sum of numerical values is 100 or not. The server 100 produces a document including a graph of the selected type and outputs it to a printer or the like.

Figure 26:
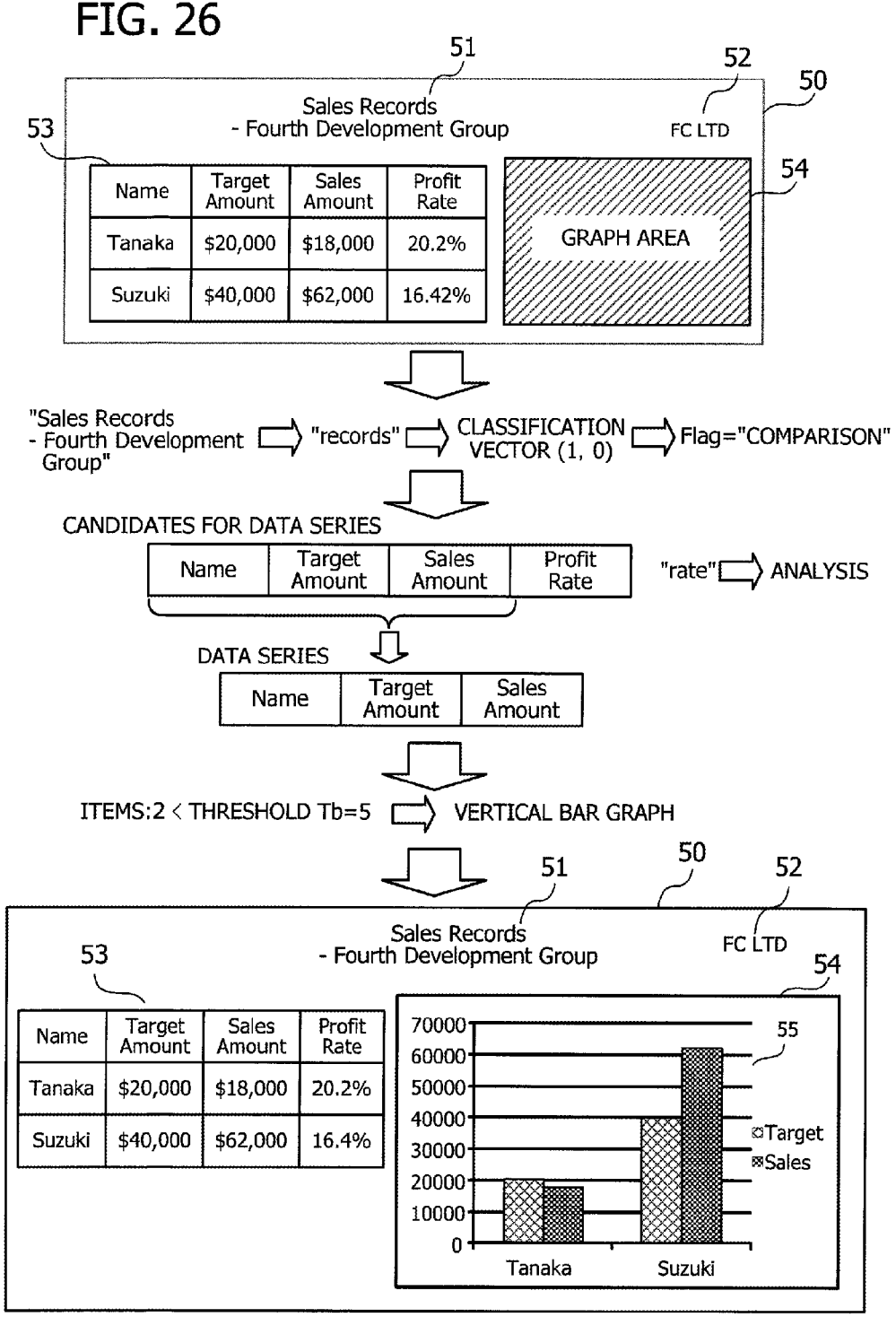
FIG. 26 illustrates a first example of how a document containing a graph is generated.

FIG. 26 illustrates a first example of how a document containing a graph is generated. The illustrated document 50 has been produced according to a document style form and includes its title 51, author name 52, table 53, and graph area 54.

The title 51 has been recognized as a character string located in the horizontal center of the upper half of the document 50. The server 100 analyzes this title 51 to determine the classification of the document as a whole. In the example of FIG. 26, the title 51 reads "Sales Records—Fourth Development Group." The character string contains the term "records," which is a registered quasi-synonym of specialized vocabulary word "record table" (see FIG. 7). Since the classification vector of this term "records" is (1, 0), the server 100 determines that the document 50 falls in the comparison group.

The server 100 then extracts character strings of column titles from the table 53 as a set of candidates for data series.

Column title "Profit Rate" is among the extracted candidates, and the term "rate" found in its character string is a quasi-synonym of specialized vocabulary word "ratio." The term "rate" is classified as "analysis" unlike the above-noted classification of the document 50 as a whole. Due to this mismatch, the column title "Profit Rate" is not qualified as a data series, and thus the server 100 selects the remaining three candidates as the data series.

According to the classification "comparison" of the document 50, the server 100 executes a graph type selection process for comparison. In the example of FIG. 26, neither temporal keywords nor numerals are found in the data series. The server 100 determines that the graph in the document 50 is intended to compare item-to-item differences.

Then based on the number of items and the number of data series, the server 100 determines which type of bar graph, horizontal or vertical, is suitable for comparison of item-to-item differences. It is assumed in the example of FIG. 26 that the aforementioned threshold Tb for the number of items is set to five. Since the source data for the table 53 includes two items per data series, meaning that the number of items is smaller than the threshold Tb. Accordingly, the server 100 selects vertical bar graphs, without the need for checking the number of data series. This graph type selection results in a vertical bar graph 55 in the graph area 54 of the document 50. In the example of FIG. 26, the server 100 identifies that the column titled "Name" gives the names of items to be compared. The resulting vertical bar graph 55 depicts "Target Amount" and "Sales Amount" for each item under the column title of "Name."

Referring now to FIGS. 27 to 29, the following section describes a second example of how a document including a graph is generated.

FIG. 27 is a first diagram that illustrates a second example of how a document containing a graph is generated. The illustrated document 60 has been produced according to a document style form and includes its title 61, output date 62, table 63, and graph area 64. The title 61 has been recognized as a character string located in the horizontal center of the upper half of the document 60. The server 100 analyzes this title 61 to determine the classification of the document 60 as a whole. In the example of FIG. 27, the title 61 reads "Person-By-Person Monthly Statistics Table (Sales)."

FIG. 28 is a second diagram illustrating the second example of document generation. The title string "Person-By-Person Monthly Statistics Table (Sales)" contains the term "table," which is a registered quasi-synonym of specialized vocabulary word "performance table" (see FIG. 7). Since the classification vector of this term "table" is (1, 0), the server 100 determines that the document 60 falls in the comparison group.

The server 100 then extracts character strings of column titles from the table 63 as a set of candidates for data series. Column title "Total" among the extracted candidates is registered as a specialized vocabulary word. The term "total", however, does not fall into any particular classes (see FIG. 7). For this reason, the column title "Total" is not qualified as a data series, and thus the server 100 selects the remaining candidates as the data series.

According to the classification "comparison" of the document 60, the server 100 executes a graph type selection process for comparison. In the example of FIG. 28, the data series include temporal keywords "Jan," "Feb," "Mar" and so on. The server 100 thus determines that the graph in the document 60 is intended to compare time-wise variations.

The server 100 then determines which type of graphs, vertical bar graph or line graph, is suitable for comparison of time-wise variations, based on the number of data series. It is assumed in the example of FIG. 28 that the aforementioned threshold Ta for the number of data series is set to five. Since the source data for the table 63 includes thirteen data series, meaning that the number of data series is greater than the threshold Ta. Accordingly, the server 100 chooses a line graph for the document 60.

FIG. 29 is a third diagram illustrating the second example of document generation. The above graph type selection results in a line graph 65 in the graph area 64 of the document 60. In this example of FIG. 29, the server 100 finds that the column titled "Person" gives the names of items. The resulting line graph 65 depicts the variations of monthly balance per person.

As can be seen from the above examples, the second embodiment makes it possible to produce an appropriate type of graph that is selected on the basis of character strings (e.g., document title, column titles and item names of a table) in the document. The proposed techniques help the user to avoid making a bad choice about graphs, thus facilitating the creation of intuitive graphs.

According to one aspect of the second embodiment, an appropriate graph type is selected from the number of items to be included in the graph. This feature eliminates the need for the user to know the relationships between the number of graph items and suitable choices of graph, thus mitigating the user's burden.

According to another aspect of the second embodiment, an appropriate graph type is selected from the number of data series to be included in the graph. This feature eliminates the need for the user to know the relationships between the number of data series and suitable choices of graph, thus mitigating the user's burden.

According to yet another aspect of the second embodiment, the column titles of a table are subjected to a screening process that rejects those unfit for the intended purpose of the document. This feature enables a graph to be generated from a set of data series suitable for the purpose.

According to still another aspect of the second embodiment, the classification vectors of two or more specialized vocabulary words included in the document title are averaged. The components of the averaged vector are compared with each other to determine whether the document in question belongs to the comparison group or analysis group. This feature of the embodiment makes it possible to classify documents (or specify their purposes) even when their title contains specialized vocabulary words suggesting comparison together with specialized vocabulary words suggesting analysis.

According to still another aspect of the second embodiment, the averaging process may give different weights to specialized vocabulary words depending on where in the title they appear. This feature makes it possible to classify documents (or specify their purposes) even when the title contains specialized vocabulary words of different categories in equal numbers.

Two embodiments and their variations have been discussed above. According to one aspect of these embodiments, the proposed techniques help the user to produce an appropriate type of graphs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A computer-readable non-transitory storage medium storing therein a graph generation program that causes a computer to perform a procedure comprising:
   producing a database of specialized vocabulary words being respectively associated with vectors, each vector is composed of first and second elements, the first element indicating an amount that a specific specialized vocabulary word suggests comparison of data, the second element indicating an amount that the specific specialized vocabulary word suggests analysis of data;
   extracting a plurality of specialized vocabulary words from a title of an electronic document, with reference to the database;
   specifying a document purpose of the electronic document, by weighting each of the vectors associated respectively with the specialized vocabulary words based on a position of the specialized vocabulary word within the title, calculating an average of the weighted vectors associated with the extracted specialized vocabulary words in the electronic document, and determining that the document purpose is comparison of data, when the first element of the calculated average overweighs the second element of the calculated average, and determining that the document purpose is analysis of data, when the second element of the calculated average overweighs the first element of the calculated average;
   determining a graph type, based on the document purpose;
   generating a graph of the determined graph type, based on data of the electronic document; and
   outputting a computer file of the electronic document containing the generated graph.

2. The computer-readable non-transitory storage medium according to claim 1, wherein the procedure further comprises:
   extracting a character string in the electronic document which satisfies predetermined criteria; and
   recognizing the extracted character string as the title of the electronic document.

3. The computer-readable non-transitory storage medium according to claim 1, wherein the procedure further comprises:
   determining a number of series of data values to be depicted in a graph in the electronic document, as well as a number of items in each of the series of data values, based on a table in the electronic document; and
   determining the graph type, based also on the number of series and the number of items.

4. The computer-readable non-transitory storage medium according to claim 3, wherein:
   the determining of the number of series is achieved by counting titles of rows or columns of the table in the electronic document, the titles containing a character string that fits the specified document purpose.

5. The computer-readable non-transitory storage medium according to claim 3, wherein the procedure further comprises:
   when the document purpose is analysis of data, calculating a sum of numerical values of each of the items; and
   selecting the graph type for analysis of data as a bar graph when the calculated sum is 100 in every item.

6. The computer-readable non-transitory storage medium according to claim 1, wherein the procedure further comprises:
   producing the electronic document, according to style data defining a graph area for accommodating a graph in the electronic document; and
   inserting the generated graph in the graph area of the produced electronic document.

7. An information processing apparatus comprising a processor configured to perform a procedure including:
   producing a database of specialized vocabulary words being respectively associated with vectors, each vector is composed of first and second elements, the first element indicating an amount that a specific specialized vocabulary word suggests comparison of data, the second element indicating an amount that the specific specialized vocabulary word suggests analysis of data;
   extracting a plurality of specialized vocabulary words from a title of an electronic document, with reference to the database;
   specifying a document purpose of the electronic document, by weighting each of the vectors associated respectively with the specialized vocabulary words based on a position of the specialized vocabulary word within the title, calculating an average of the weighted vectors associated with the extracted specialized vocabulary words in the electronic document, and determining that the document purpose is comparison of data, when the first element of the calculated average overweighs the second element of the calculated average, and determining that the document purpose is analysis of data, when the second element of the calculated average overweighs the first element of the calculated average;
   determining a graph type, based on the document purpose;
   generating a graph of the determined graph type, based on data of the electronic document; and
   outputting a computer file of the electronic document containing the generated graph.

8. A method for producing a graph, the method comprising:
   producing, by a processor a database of specialized vocabulary words being respectively associated with vectors, each vector is composed of first and second elements, the first element indicating an amount that a specific specialized vocabulary word suggests comparison of data, the second element indicating an amount that the specific specialized vocabulary word suggests analysis of data;
   extracting, by the processor, a plurality of specialized vocabulary words from a title of an electronic document, with reference to the database;
   specifying, by the processor, a document purpose of the electronic document, by weighting each of the vectors associated respectively with the specialized vocabulary words based on a position of the specialized vocabulary word within the title, calculating an average of the weighted vectors associated with the extracted specialized vocabulary words in the electronic document, and determining that the document purpose is comparison of data, when the first element of the calculated average overweighs the second element of the calculated average, and determining that the document purpose is analysis of data, when the second element of the calculated average overweighs the first element of the calculated average;

determining, by the processor, a graph type, based on the document purpose;

generating, by the processor, a graph of the determined graph type, based on data of the electronic document; and outputting, by the processor, a computer file of the electronic document containing the generated graph.

* * * * *